(12) United States Patent
BeSerra et al.

(10) Patent No.: US 11,042,496 B1
(45) Date of Patent: Jun. 22, 2021

(54) PEER-TO-PEER PCI TOPOLOGY

(71) Applicant: Amazon Technologies, Inc., Seattle, WA (US)

(72) Inventors: Christopher James BeSerra, Federal Way, WA (US); Kypros Constantinides, Seattle, WA (US); Uwe Dannowski, Moritzburg (DE); Nafea Bshara, San Jose, CA (US); Matthew Shawn Wilson, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 554 days.

(21) Appl. No.: 15/282,487

(22) Filed: Sep. 30, 2016

Related U.S. Application Data

(60) Provisional application No. 62/376,369, filed on Aug. 17, 2016.

(51) Int. Cl.
*G06F 13/40* (2006.01)
*G06F 13/42* (2006.01)

(52) U.S. Cl.
CPC ...... *G06F 13/4022* (2013.01); *G06F 13/4282* (2013.01)

(58) Field of Classification Search
None
See application file for complete search history.

(56) References Cited

U.S. PATENT DOCUMENTS

| 7,783,818 | B1 * | 8/2010 | Sardella | G06F 13/409 |
| | | | | 710/301 |
| 7,917,658 | B2 * | 3/2011 | Pettey | H04L 12/4633 |
| | | | | 710/15 |
| 9,336,173 | B1 * | 5/2016 | Sodke | G06F 13/4022 |

(Continued)

OTHER PUBLICATIONS

Ellis, Scott. Exploring the PCIe Bus Routes. [online]. The Cirrascale Blog, Aug. 13, 2014 [retrieved on Jan. 28, 2017]. Retrieved from the Internet: <URL: http://www.cirrascale.com/blog/index.php/exploring-the-pcie-bus-routes/>.

(Continued)

*Primary Examiner* — Henry Tsai
*Assistant Examiner* — Christopher A Bartels
(74) *Attorney, Agent, or Firm* — Kilpatrick Townsend & Stockton LLP

(57) ABSTRACT

Provided are systems and methods for enabling peer-to-peer communications between peripheral devices. In various implementations, a computing system can include a PCI switch device. The first PCI switch device can include a first port and be communicatively coupled to a first root complex port. The first PCI switch device can have access to a first PCI endpoint address range. The computing system can further include a second PCI switch device. The second PCI switch device can include a second port, connected to the first port. The second PCI switch device can be communicatively coupled to a second root complex port that is different from the first root complex port. The second PCI switch device can receive a transaction addressed to the first PCI endpoint address range, and identify the transaction as associated with the second port. The second PCI switch device can subsequently transmit the transaction using the second port.

24 Claims, 8 Drawing Sheets

(56) References Cited

U.S. PATENT DOCUMENTS

| | | | | |
|---|---|---|---|---|
| 9,432,298 B1* | 8/2016 | Smith | ............... | H04L 49/9057 |
| 10,162,780 B2* | 12/2018 | Choi | ............... | G06F 13/4022 |
| 2007/0097949 A1* | 5/2007 | Boyd | ............... | G06F 13/4022 |
| | | | | 370/351 |
| 2007/0136458 A1* | 6/2007 | Boyd | ............... | G06F 15/17375 |
| | | | | 709/224 |
| 2008/0209203 A1* | 8/2008 | Haneda | ............... | G06F 21/72 |
| | | | | 713/150 |
| 2009/0077297 A1* | 3/2009 | Zhao | ............... | G06F 9/5011 |
| | | | | 710/314 |
| 2013/0097600 A1* | 4/2013 | Cardona | ............... | G06F 9/45558 |
| | | | | 718/1 |
| 2014/0122833 A1* | 5/2014 | Davis | ............... | G06F 15/7803 |
| | | | | 712/29 |
| 2014/0189427 A1* | 7/2014 | Jayaprakash Bharadwaj | ............... | G06F 11/1415 |
| | | | | 714/15 |
| 2014/0198790 A1* | 7/2014 | Christenson | ............... | H04L 43/0811 |
| | | | | 370/392 |
| 2014/0359044 A1* | 12/2014 | Davis | ............... | H04L 45/60 |
| | | | | 709/213 |
| 2015/0143018 A1* | 5/2015 | Kim | ............... | G06F 13/4022 |
| | | | | 710/316 |
| 2015/0169487 A1* | 6/2015 | Subramaniyan | ............... | G06F 13/4022 |
| | | | | 710/5 |
| 2015/0180782 A1* | 6/2015 | Rimmer | ............... | H04L 69/22 |
| | | | | 370/236 |
| 2015/0261709 A1* | 9/2015 | Billi | ............... | G06F 13/404 |
| | | | | 710/316 |
| 2015/0370700 A1* | 12/2015 | Sabol | ............... | G06F 12/0246 |
| | | | | 711/103 |
| 2016/0077964 A1* | 3/2016 | Chang | ............... | G06F 12/0253 |
| | | | | 711/103 |
| 2016/0154756 A1* | 6/2016 | Dodson | ............... | G06F 13/4022 |
| | | | | 710/316 |
| 2016/0292099 A1* | 10/2016 | Davis | ............... | G06F 13/28 |
| 2016/0378545 A1* | 12/2016 | Ho | ............... | G06F 9/50 |
| | | | | 718/107 |
| 2017/0024570 A1* | 1/2017 | Pappachan | ............... | G06F 13/28 |
| 2017/0091108 A1* | 3/2017 | Arellano | ............... | G06F 12/0888 |
| 2017/0187846 A1* | 6/2017 | Shalev | ............... | H04L 69/22 |
| 2017/0199827 A1* | 7/2017 | Sankaran | ............... | G06F 9/45558 |
| 2017/0269959 A1* | 9/2017 | Agarwal | ............... | G06F 13/4068 |
| 2017/0322899 A1* | 11/2017 | Ni | ............... | G06F 12/0246 |
| 2018/0089881 A1* | 3/2018 | Johnson | ............... | G06F 9/45558 |

OTHER PUBLICATIONS

NVIDIA Tesla P100: GP100 Pascal Whitepaper. [online]. NVIDIA® Corporation, 2016 [retrieved on Jan. 28, 2017]. Retrieved from the Internet: <URL: https://images.nvidia.com/content/pdf/tesla/whitepaper/pascal-architecture-whitepaper.pdf>.

Southard, Dale. Designing and Managing GPU Clusters. [online]. NVIDIA® Corporation, 2011 [retrieved on Jan. 28, 2017]. Retrieved from the Internet: <URL: http://www.nvidia.com/content/pdf/gdc2011/dale_southard_sc11.pdf>.

Walker, Ross. Exploring the Complexities of PCIe Connectivity and Peer-to-Peer Communication [online]. Exxact Corporation, Apr. 4, 2016 [retrieved on Jan. 28, 2017]. Retrieved from the Internet: <URL: https://exxactcorp.com/blog/exploring-the-complexities-of-pcie-connectivity-and-peer-to-peer-communication/>.

* cited by examiner

PEER-TO-PEER PCI TOPOLOGY

CROSS REFERENCE TO RELATED APPLICATIONS

This application claims the benefit of U.S. Provisional Patent Application No. 62/376,369, filed Aug. 17, 2016, and titled "PEER-TO-PEER PCI TOPOLOGY," the content of which is herein incorporated by reference in its entirety.

BACKGROUND

Computing systems generally include peripheral devices. A peripheral device is a device that can extend, adapt, and/or modify the functionality of the computing system. Peripheral devices may be connected to a computing system internally or externally, and typically communicate with a computing system through one or more busses. The manner in which data is transferred on a bus is typically defined by a bus protocol. Examples of bus protocols include the Peripheral Component Interconnect (PCI) family of bus protocols (e.g., PCI, PCI-eXtended (PCI-X), PCI Express (PCIe), PCI derivatives such as Accelerated Graphics Port (AGP), etc.), among others.

In some computing systems, it may be desirable for one peripheral device to be able to use the resources of another peripheral device. For example, a PCI-based peripheral device may include a graphics processing unit (GPU). In many cases, a computing system may include multiple PCI devices, each hosting a GPU. In such systems, mathematical operations can be executed on multiple GPUs in parallel. When multiple GPUs are operating on the same data, one GPU may need access to the memory of another GPU to, for example, provide computational results or to obtain computational results.

Generally, when a peripheral device uses the resources of another peripheral device, the peripheral devices use a peer-to-peer communication system. "Peer-to-peer" generally describes a distributed architecture where tasks are partitioned between "peers" in a system. Peers are generally equally privileged and equal participants in a system. In a peer-to-peer system, the peers generally make at least a portion of their resources—such as processing power, disk storage, memory, and/or network bandwidth—directly available to other peers, without the need for central coordination by a host processor.

BRIEF DESCRIPTION OF THE DRAWINGS

Various embodiments in accordance with the present disclosure will be described with reference to the drawings, in which.

DETAILED DESCRIPTION

Figure 1:
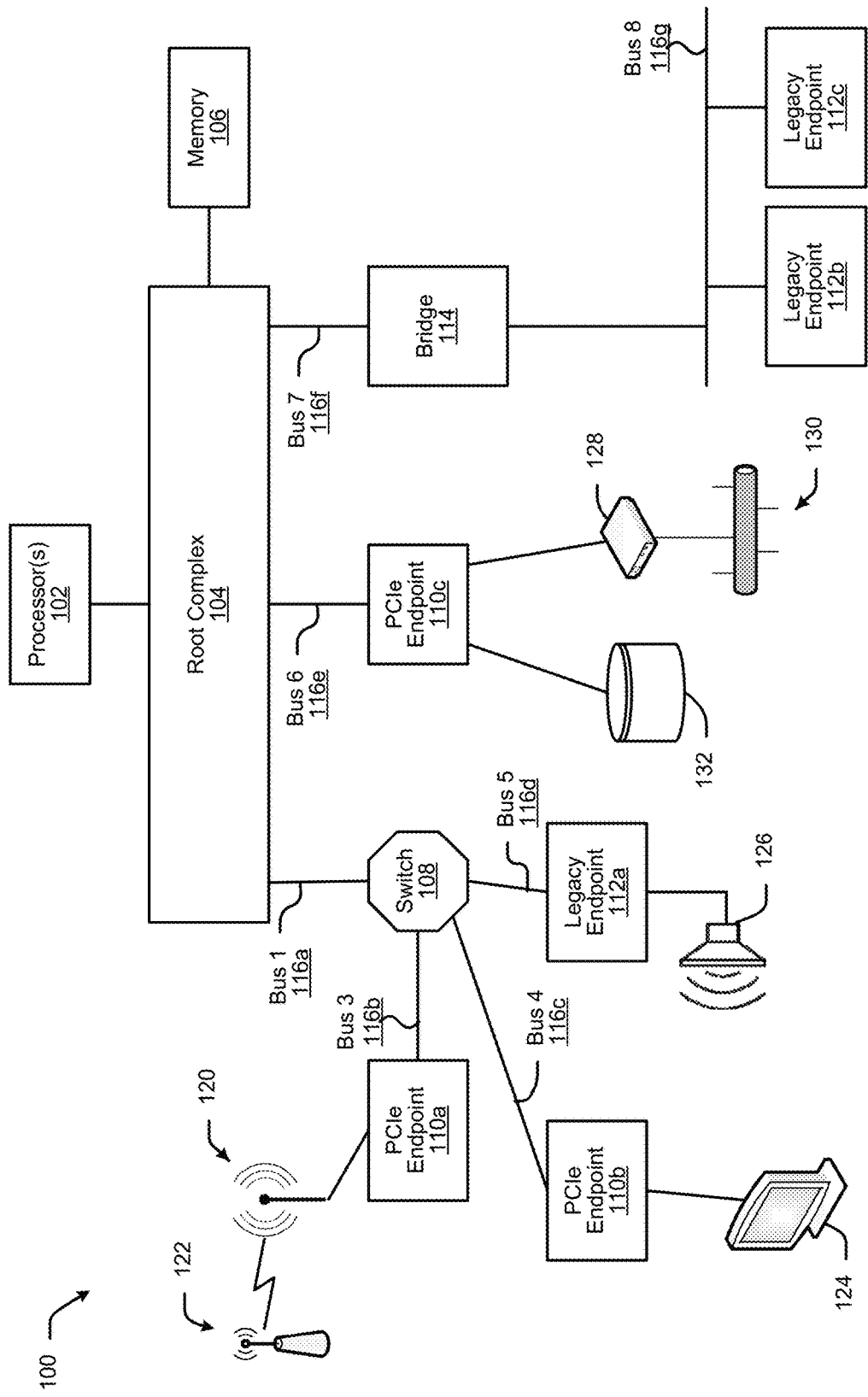
FIG. 1 illustrates an example of a computing system that includes multiple peripheral devices.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Computing systems generally include peripheral devices. A peripheral device is a device that can extend, adapt, and/or modify the functionality of the computing system. For example, peripheral devices may provide storage, network connectivity, and/or audio and video support to a computing system. Peripheral devices may be connected to a computing system internally or externally, and typically communicate with a computing system through one or more busses. The manner in which data is transferred on a bus is typically defined by a bus protocol. Examples of bus protocols include the Peripheral Component Interconnect (PCI) family of bus protocols (e.g., PCI, PCI-eXtended (PCI-X), PCI Express (PCIe), PCI derivatives such as Accelerated Graphics Port (AGP), etc.), among others.

In some computing systems, it may be desirable for one peripheral device to be able to use the resources of another peripheral device. For example, a PCI-based peripheral device may include a graphics processing unit (GPU). A GPU is an integrated circuit device designed to perform rapid mathematical calculations, generally executing multiple calculations in parallel. GPUs can be used for rendering computer graphics, as well as for other computationally heavy operations, such as financial modeling, weather modeling, and scientific research. In many cases, a computing system may include multiple PCI devices, each hosting a GPU. In such systems, mathematical operations can be executed on multiple GPUs in parallel. When multiple GPUs are operating on the same data, one GPU may need access to the memory of another GPU to, for example, provide computational results or to obtain computational results. A PCI-based peripheral device with a GPU is presented as one example where one peripheral device may use the resources of another peripheral device. Other examples include networking applications, where a network interface card may transmit transactions directly to another network card. Other examples include storage applications, where one storage interface card may read and write directly to another storage interface card. Other examples include network security applications, where one encryption card can encrypt data on a different encryption card.

Generally, when a peripheral device uses the resources of another peripheral device, the peripheral devices use a peer-to-peer communication system. "Peer-to-peer" generally describes a distributed architecture where tasks are partitioned between "peers" in a system. Peers are generally equally privileged and equal participants in a system, in contrast to a client-server system, where the consumption and supply of resources is divided. In a peer-to-peer system, the peers generally make at least a portion of their resources—such as processing power, disk storage, memory, and/or network bandwidth—directly available to other peers, without the need for central coordination by a host processor.

In a computing system that uses PCI as the interconnect between peripheral devices, the PCI protocol and the topology of the system can provide communication channels for peer-to-peer communications between PCI devices. For example, two PCI endpoint devices can be connected, directly or indirectly, to the same PCI switch device. In such a case, one PCI endpoint can send transactions to the switch device, which can then send the transactions to the second PCI endpoint. In this example, transactions need not be sent from the switch to a processor in the system, for the processor to then route the transaction to the correct recipient endpoint device. In another example, one PCI endpoint device can be connected (directly or indirectly) to one processor while a second PCI endpoint device can be connected (directly or indirectly) to a different processor. In this case, the two processors can have a processor-to-processor communication channel. In this example, the first PCI endpoint device can send a transaction to the second endpoint device by first sending the transaction to the processor that is connected to the first PCI endpoint device. The processor can then, using the processor-to-processor communication channel, transfer the transaction to the other processor, which can then send the transaction on to the second PCI endpoint device.

While peer-to-peer communications between PCI endpoint devices that share a switch device can be very efficient, peer-to-peer communications between PCI endpoints that require the assistance of processors can suffer high latency and require a large amount of bandwidth. For example, a memory transaction from one PCI endpoint device to another PCI endpoint device may require, first, copying from the memory of the first PCI endpoint device to the memory attached to a processor. The processor can then transfer the values from its own memory to the memory of a second processor. The second processor can then copy the values from its memory to the memory of a second PCI endpoint device. These copy operations are generally slow, can occupy a large amount of processor time, and, when a large number of memory transactions occur, can use a large amount of the system's bandwidth. The number of PCI endpoint devices that can communicate in this fashion may also be limited. For example, a processor may have a limited number of PCI channels, such as for example 40 PCI channels. In various implementations, a PCI device can use up to sixteen channels. Thus, in this example, when a computing system uses just one such processor, the system maybe be limited to two PCI endpoints devices that can inter-communicate, should these two PCI endpoint each use all sixteen channels available to each of them.

In various implementations, a peripheral device topology can provide a communication channel between PCI switch devices for peer-to-peer communication between PCI endpoint devices that are not within the same switch hierarchy. Specifically, one PCI endpoint can be connected to one switch, where the switch is connected to a root complex port of one processor. A second PCI endpoint can be connected to another switch, where this switch is connected to the root complex port of a different processor. To avoid needing to use the processors to enable communications between the PCI endpoints in this scenario, a port on the one PCI switch device can be connected directly to a port on the other PCI switch device. The port on the one PCI switch device can further be configured with address ranges that are available from the other PCI switch device, but that would otherwise not be available to the one PCI switch device, other than through a processor. Similarly, the port on the other PCI switch device can be configured with address ranges available from the one PCI switch device, but not otherwise available from the other PCI switch device.

Thus configured, a PCI endpoint device connected to the one PCI switch device can send transactions directly to a PCI endpoint device connected to the other PCI switch device. Specifically, a first PCI endpoint can be connected (directly or indirectly) to the one switch, while a second PCI endpoint can be connected (directly or indirectly) to the other switch. The first PCI endpoint can send transactions to the second PCI endpoint using the address space of the second PCI endpoint. When the one switch to which the first PCI endpoint is connected receives such a transaction, the switch can identify the transaction as being associated with the port that connects the switch to the other switch. Without the port being configured with the address range of the second PCI endpoint, the switch would otherwise determine that none of its ports include the address of the transaction, and the switch would send the transaction towards a system processor. With the port being configured with the address range of the second PCI endpoint, the switch can instead send the transaction over this port to the other switch. Upon receiving the transaction, the other switch can determine that one of its ports (the one connected to the second PCI endpoint) includes the address of the transaction. The other switch can then transmit the transaction using this port.

Using the topology and port configuration discussed above, a computing system can enable peer-to-peer communications between many PCI endpoint devices. For example, one processor root complex can support two, four, eight, or more peer endpoint devices, and be coupled, through a switch-to-switch connection, to another processor root complex that supports two, four, eight, or more peer endpoint devices. As another example, two, three, four, or more processor subsystems can be coupled through switch-to-switch connections. Systems configured according to these examples can further allocate resources in a flexible manner. For example, two PCI endpoints can be assigned to one user (e.g., by assigning the two endpoints to one virtual machine) without concern for which root complex the two PCI endpoints are attached to. As another example, using the same computing system as in the previous example, all of the PCI endpoints can be assigned to one user, who then may, for example, have access to a large amount of parallel computing resources.

FIG. 1 illustrates an example of a computing system 100 that includes multiple peripheral devices. Peripheral devices may include hardware devices and/or devices that include a combination of hardware and software, which can be attached to a computing system to add functionality to the computing system 100. Examples of peripheral devices include storage devices, displays, speakers, wired and/or wireless network adapters, adapters to provide additional ports to the system (such as serial and/or parallel ports), bridges, hubs, and/or switches that provide ports for additional peripheral devices, and others. Generally, peripheral devices can be connected and disconnected from the computing system to change the functionality of the system. In some cases, the computing system must be powered down for a peripheral device to be added or removed. In other cases, the peripheral device can be attached or removed while the computer system is powered on (often referred to as "hot-swapping" or "hot-plugging").

The example of FIG. 1 illustrates a computing system 100 that includes peripheral devices that implement one or more variations of the Peripheral Component Interconnect (PCI) standard bus protocols. A bus is a communication channel that transfers data within a computing system, or between a computing system and other devices. A standard bus protocol is a data transfer protocol for which a specification has been defined and adopted by various manufacturers. Manufacturers ensure that compliant devices are compatible with computing systems implementing the bus protocol, and vice versa. PCI describes a family of related, standardized bus protocols. PCI includes the original PCI standard, PCI-eXtended (PCI-X), Accelerated Graphics Port (AGP), and PCI Express (PCIe, also referred to as PCI-XP). The term "PCI" or "PCI-based" may be used herein to describe any protocol in the PCI family of bus protocols. The peripheral devices illustrated in FIG. 1 can also include peripheral devices that implement bus protocols that are based on a PCI bus protocol, such as Non-Volatile Memory Express (NVMe), a bus protocol used for high-speed storage disks and that operates on top of a PCIe bus.

In the example shown in FIG. 1, PCI is provided as an example of a bus protocol that can be implemented by a computing system to connect to peripheral devices. A computing device can use other bus protocols, such as for example, Industry Standard Architecture (ISA), Extended ISA (EISA), Video Electronics Standards Association (VESA), Micro Channel, and any of the Advanced Technology Attachment (ATA) family of protocols, among others. The illustrated example can also be implemented with a combination of standard bus protocols, a combination of proprietary bus protocols, and/or a combination of standard and proprietary bus protocols.

The example computing system 100 may include one or more processors 102, a root complex 104, a memory subsystem 106, a switch 108, a bridge 114, and a number of peripheral devices. In this example, the peripheral devices include PCIe endpoints 110*a-c* and legacy endpoints 112*a-c*. The processors 102 may be general purpose computing devices such as are manufactured by Intel®, AMD®, ARM®, Qualcomm®, an others. The processors 102 are generally capable of executing software code. A processor may include multiple processing cores.

The root complex 104 may be a hardware device or a hardware and software device that connects the processors 102 and the memory subsystem 106 to the peripheral devices. The peripheral devices may be connected directly to the root complex 104. For example, the PCIe endpoint 110*c* is connected directly to the root complex 104. Alternatively or additionally, the peripheral devices may be connected to the root complex 104 through a switch 108. A bridge 114 may also be connected to the root complex 104. The root complex 104 may forward transactions to the processors 102 and direct responses from the processors 102 back to the peripheral devices. The root complex 104 may further generate transactions on behalf of the processors 102, and forward responses to those transactions back to the processors 102. In some cases, the root complex 104 may also route transactions from one peripheral device to another, and/or between peripheral devices, switches, and bridges. The root complex 104 may provide services for the computer system 100, such as a hot plug controller, a power management controller, an interrupt controller, and/or error detection and reporting. In some implementations, the root complex 104 may be implemented as part of a host system that includes one or more integrated processors. In some cases, memory may also be integrated into the host system.

The memory subsystem 106 may provide temporary or long-term storage for data that may be used by the computing system 100. The memory subsystem 106 may include Dynamic Random Access Memory (DRAM), Synchronous DRAM (SDRAM), and/or Double Data Rate (DDR), among others. In some cases, the memory subsystem 106 may also include Read-Only Memory (ROM), such as Programmable Read-Only Memory (PROM), Erasable Programmable Read-Only Memory (EPROM), Electrically Erasable Programmable Read-Only Memory (EEPROM), and/or Flash EEPROM, among others. In some implementations, the root complex 104 may include a memory controller to manage transactions to and from the memory subsystem 106. In other implementations, the processors 102 may include a memory controller. Alternatively or additionally, the computing system 100 may include an external memory controller in communication with either the processors 102, the root complex 104, or both the processors 102 and the root complex 104, and the memory subsystem 106.

Peripheral devices are devices that can generate and/or respond to data transactions. For example, peripheral devices may be "requesters" (transaction generators) and/or "completers" (transaction responders). In PCI implementations, peripheral devices may include PCIe endpoints, where "endpoint" describes a peripheral device that is configured to communicate using a PCI protocol. Other peripheral devices may be legacy endpoints, that is, peripheral devices that are configured to communicate using a PCI protocol other than PCIe, such as the original PCI standard or PCI-X. Though not illustrated here, the computing system 100 may further include peripheral devices that implement another bus standard, such as for example, Small Computer System Interface (SCSI), Serial ATA (SATA), or Parallel ATA (PATA), among others.

The switch 108 functions as a multi-port connecter between various devices, including the root complex 104, peripheral devices, and possibly other switches and bridges. The switch 108 may route transactions between any of the devices connected to it. For example, the switch 108 may route transactions between the PCIe endpoints 110*a-b* and the legacy endpoint 112*a*, and between the various endpoints 110*a-b*, 112*a* and the root complex 104. The switch 108 may also provide arbitration to prioritize incoming and outgoing transactions. Devices connected to the switch 108 may treat the switch 108 as another requester and/or completer. Though not illustrated here, switches can also be connected to other switches to further expand the number of peripheral devices that can be connected to the computing system 100.

The bridge 114 may provide connectivity to other busses or switching fabrics. The other busses or switching fabrics may implement a PCI variant or another protocol. For example, in the example of FIG. 1, the bridge 114 provides connectivity to a bus implementing the original PCI standard. The bridge 114 may include mechanisms to translate from one bus protocol, such as the original PCI standard, to another protocol, such as PCIe.

Components in the computing system 100 may be connected through a shared bus. For example, in the illustrated example, the legacy endpoints 112*b-c* are connected to a shared PCI bus 116*g*. Alternatively or additionally, peripheral devices may be connected to the computing system 100 in a switching fabric topology. The interconnected devices illustrated in FIG. 1, including the root complex 104, the switch 108, the bridge 114, and the PCIe endpoints 110-*c*, form an example of a switching fabric. A switching fabric topology includes point-to-point connections between the devices connected to the fabric, and may include a routing system for passing messages between the devices. In a switching fabric, transactions may be spread across multiple physical links. In the example of FIG. 1, the switch 108 is connected to the root complex 104 with Bus 1 116*a* and the PCIe endpoint 110*c* is connected to the root complex with Bus 6 116*e*. Similarly, the bridge 114 is connected to the root complex with Bus 7 116*f*. Each of the PCIe endpoints 110*a-b* and the legacy endpoint 112*a* are also connected to the switch 108 with individual busses 116*b-d*. The connections between each of the root complex 104, the switch 108, the bridge 114, the PCIe endpoints 110*a-c* and the legacy endpoint 112*a* are point-to-point because each of the busses 116*a-g* are not shared with another device. Furthermore, a packet directed from one device to another (for example, from the root complex 104 to the PCIe endpoint 110*a*) is routed directly to its destination.

In some implementations, the connections between the devices in the computing system 100 may be numbered. For example, in the illustrated example, the connection between the switch 108 and the root complex 104 is labeled Bus 1 116*a* (Bus 0 may be internal to the root complex 104). Similarly, each of the busses connecting the PCIe endpoints 110*a-b* and the legacy endpoint 112*a* to the switch 108 are labeled Bus 3 116*b*, Bus 4 116*c*, and Bus 5 116*d*, respectively (Bus 2 may be internal to the switch 108). Furthermore, the connection between the root complex 104 and the PCIe endpoint 110*c* may be labeled Bus 6 116*e*, while the connection between the root complex and the bridge 114 may be labeled Bus 7 116*f*. Finally, the shared bus downstream from the bridge 114 may be labeled Bus 8 116*g*. In most cases the numbering of the busses is arbitrary, though bus numbers are generally assigned in a logical fashion. For example, Bus 0 may be located within the root complex 104, and the bus label may increment as the distance between the bus and the root complex 104 increases.

As noted above, peripheral devices may add to and/or modify the functionality of the computing system 100. For example, one PCIe endpoint 110*a* may implement a Wi-Fi adapter 120. Using the Wi-Fi adapter 120, the computing system 100 may be able to communicate wirelessly with a wireless access point 122, and thereby access a network. As another example, another PCIe endpoint 110*b* may implement a video card. A video card may include a port to connect a monitor 124 or other display device. As a further example, the computing system 100 may include a legacy endpoint 112*a* that implements a sound card. A sound card may include a port or jack that accepts a plug for a speaker 126 or other audio output device.

In some cases, a PCIe endpoint may be a multi-function device, that is, a device that provides the services of multiple devices. For example, the PCIe endpoint 110*c* may include an Ethernet adapter, and provide a connection to a gateway device 128, such as a DSL or cable modem. The PCIe endpoint 110*c* may also include a storage adapter, and provide a connection to a storage device 132. The one PCIe endpoint 110*c* thus may provide access to a network 130, as well as access to a storage device 132. The hardware and/or software components in the peripheral device that provide the services of, for example, a network interface or a storage controller may be called a "function." In the context of PCI devices, the terms "function" and "service" may be synonymous, though in other contexts this is not necessarily the case. Types of functions that may be provided by a peripheral device include, for example, mass storage controllers, network controllers, display controllers, multimedia devices, memory controllers, bridges, input devices docking stations, serial bus controllers, wireless controllers, satellite communications controllers, and encryption/decryption controllers, among others. In some implementations, functions can be added to a peripheral device, for example by connecting daughter cards or external devices to expansion slots or external ports on the peripheral device.

In some implementations, a multi-function PCI device may provide up to eight separate functions. In many implementations, the functions provided by a peripheral device may be identified by a function number. For example, Function 0 of the PCIe endpoint 110*c* may be a mass storage controller, while Function 1 may be a network interface.

When a computing system such as computing system 100 illustrated in FIG. 1 initially powers up, the processors 102 may be unaware of any peripheral devices that are connected to the system. The processors 102 may be aware of the root complex 104, and possibly also that the root complex 104 is connected to one or more busses. To learn about the rest of the system, the processors 102 may execute a process to scan and configure the system. This process may be referred to as an enumeration process. The specific process of scanning for, locating, and identifying peripheral devices may be called discovery or discovering. During an enumeration process, software executing on the processors 102 may first scan each of the busses 116*a*, 116*e*, 116*f* connected to the root complex 104, and identify the switch 108, the PCIe endpoint 110*c*, and the bridge 114. Upon discovering the switch 108, the processors 102 may next scan the busses 116*b-d* connected to the switch 108. The processors 102 thereby discover the PCIe endpoints 110*a-c* and the legacy endpoint 112*a*. Upon discovering the bridge 114, the processors 102 may also scan Bus 8 116*g*; however, the bridge 114 may translate the scanning instructions to the protocol implemented by Bus 8 116*g*.

While scanning the busses, or possibly after, the processors 102 may also transmit configuration transactions to each of the devices it discovers. Configuration may include, for example, assigning one or more address spaces. For example, PCI devices typically include one or more of a memory address space and/or an Input/Output (I/O) address space. Each of these address spaces may be subdivided into multiple blocks. These address spaces and address space blocks may each be assigned a base address, where the base address establishes the region of memory that is assigned to the address space. In some implementations, these base addresses may be stored in configuration registers in a configuration space included in a device. Software executing on the processors 102 may be responsible for managing all available memory, and, for example, ensuring that no two devices are assigned overlapping memory regions. Alternatively or additionally, memory may be managed by a memory controller.

Configuration may further include programming information, such as a bus number and/or a device number, into configuration registers included in the peripheral devices. During configuration, the processors 102 may also read information from configuration registers. For example, the PCIe endpoint 110*c* may include a configuration register that indicates that it has two functions. The PCIe endpoint 110*c* may further include separate configuration registers for each function. Each function's configuration registers may further include information that indicates the capabilities of each function. For example, a configuration register may indicate that Function 0 is a mass storage controller, and another configuration register may indicate that Function 1 is a network interface. In most implementations, configuration registers are included in the hardware of a device.

In some implementations, the switch 108 and the bridge 114 also include a configuration space with configuration registers. In such implementations, the processors 102 may discover the switch and bridge functionality by reading configuration registers in the switch 108 and the bridge 114. The switch 108 and the bridge 114 may also be configured by the processors 102, for example with bus and device numbers.

Figure 2:
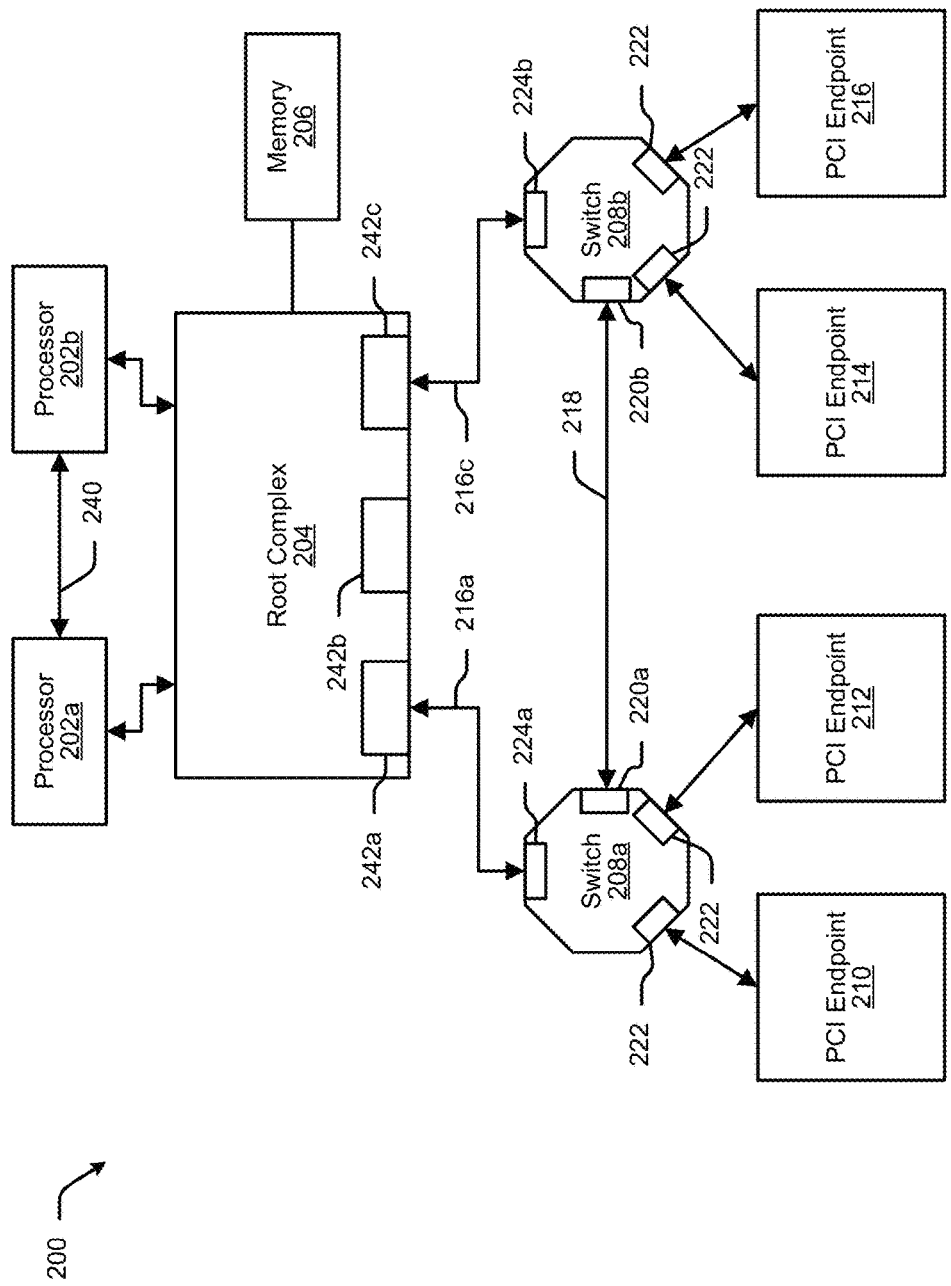
FIG. 2 illustrates an example of computing system in which peer-to-peer communications between PCI endpoint devices can be enabled.

FIG. 2 illustrates an example of computing system 200 in which peer-to-peer communications between PCI endpoint devices can be enabled. In this example, the computing system 200 includes four PCI endpoints 210, 212, 214, 216. Two of the PCI endpoints 210, 212 are connected to a first switch 208a, and two of the PCI endpoints 214, 216 are connected to a second switch 208b. Each of the two switches 208a, 208b are, in turn, connected to two different ports 242a, 242c of a root complex 204 using PCI interconnects 216a, 216c. The root complex 204 in this example is in communication with one or more processors 202a 202b and a memory subsystem 206. The root complex 204 may include an additional port 242b, which may be connected, using additional PCI interconnects, to other PCI switches, bridges, and/or endpoints. In this example, PCI is used as an example of a bus protocol that may be implemented by the computing system 200 to connect to peripheral devices. In various implementations, the computing system 200 can alternatively or additionally connect to peripheral devices using other bus protocols, such as SCSI, SATA, or PATA, among others, or a combination of different bus protocols including PCI.

The processors 202a, 202b may be general purpose computing devices that are generally capable of executing software code. A processor may include multiple processing cores. In some implementations, the root complex 204 can be integrated into one or both processors 202a, 202b. Alternatively, in some implementations, the processors 202a, 202b and the root complex 204 may be included on the same die. The root complex 204 can route transactions between the processors 202a, 202b and any of the endpoints, switches, or bridges, or between the endpoints, switches, and bridges themselves. The processors 202a, 202b can further move data from the memory subsystem 206 to and from any of the PCI endpoints 210, 212, 214, 216 in the system. The memory subsystem 206 provides temporary or long-term storage for data that may be used and operated on by the computing system 200.

In some implementations, the processors 202a, 202b can include an inter-processor communication link 240. The inter-processor communication link 240 can be used to transfer transactions directly from one processor 202a to the other processor 202b. Such a transaction would otherwise be sent over a processor bus, a system bus, or over a communication link provided by the root complex 204, each of which may be shared with other devices. Examples of inter-process communication protocols include QuickPath Interconnect (QPI), front-side bus (FSB), and HyperTransport, among others.

In some implementations, one processor 202a may have exclusive control over one of the root complex ports (e.g., a first root complex port 242a) while the other processor 202b may have exclusive control over another root complex port (e.g., a second root complex port 242c). In these implementations, transactions received at the first root complex port 242a are always directed to the first processor 202a, while transactions received at the second root complex port 242c are always directed to the second processor 202b. In some implementations, no processor 202a, 202b has exclusive control over a root complex port, and transactions received at a root complex port can be directed to whichever processor 202a, 202b can received the transactions (e.g., because the processor 202a, 202b is available, or because a transaction was addressed to one or the other of the processors 202a, 202b, or for some other reason).

In various implementations, the system 200 can include more than two processors in communication the root complex 204. In these implementations, each pair of processors can include an inter-processor communication link. In some implementations, the system 200 can include only one processor.

As discussed above, the switches 208a, 208b operate as multi-port connectors, enabling many PCI endpoint devices to be connected to one port of the root complex 204. A switch can have, for example, 2, 8, 12, 24, or more ports, any of which can be connected to a PCI endpoint, a bridge, or another switch. In the illustrated example, two PCI endpoints 210, 212 are connected to two available downstream ports 222 on the first switch 208a, while the other two PCI endpoints 214, 216 are connected to two available downstream ports 222 on the second switch 208b. The ports 222 may include a physical interface for connecting to a cable, socket, port, or other connection to a PCI interconnect. The ports 222 may further include hardware and/or software to manage incoming and outgoing transactions.

A switch can be thought of as consisting of logical PCI-to-PCI bridges, with one bridge associated with each of the switch's ports. The bridges can further be thought of as connected to a bus that is internal to the switch and not visible to the rest of the system 200. A switch can thus "bridge" or "route" or "switch" transactions from one of its ports to another. Each port can, similar to a bridge, have an individual set of configuration registers. The configuration registers can further include registers that define the range of addresses that are available at the port. For example, the downstream ports 222 of the first switch 208a can each be configured with the address range of the respective PCI endpoints 210, 212. Similarly, the downstream ports 222 of the second switch 208b can each be configured with the address range of the PCI endpoints 214, 216 to which each port 222 is connected. The downstream ports 222 in this example are designated as "downstream" because transactions transmitted from the downstream ports 222 flow away from the root complex 204.

A switch generally also includes one upstream port, designated as "upstream" because the upstream port is connected, directly or indirectly, to a root complex. Specifically, the upstream port is either connected to a root complex port, or the upstream port is connected to another switch that is closer to the root complex. In the illustrated example, the first switch 208a includes an upstream port 224a, connected to a root complex port 242a. Similarly, the second switch 208b includes an upstream port 224b, connected to a root complex port 242c. Generally, the PCI specification requires that a switch have only one upstream port. Thus, for example, should an additional switch be connected to a downstream port 222 of, for example, the first switch 208a, the upstream port of this additional switch would be used to connect the additional switch to the first switch 208a. Furthermore, in this example, any endpoints connected to the additional switch can reach the root complex 204 only through the first root complex port 242a.

The example computing system 200 of FIG. 2 can further enable peer-to-peer communications between the attached PCI endpoints 210, 212, 214, 216. For various reasons, one endpoint may need to share its resources (e.g., processing, memory, networking, storage, etc.) with another endpoint. For example, each of the PCI endpoints 210, 212, 214, 216 may include a GPU and memory. Unlike a general purpose processor, a graphics processor is designed primarily for executing possibly thousands of simultaneous calculations. To support so many simultaneous operations, a graphics processor may have hundreds of processing cores, compared to the hundred or fewer cores that may be found in a general purpose processor. A general purpose processor, though not able to execute the number of calculations as can a graphics processor, can execute a more diverse range of operations, such as managing memory, managing hardware resources, and executing an operating system A general purpose processor can, however, offload computationally heavy loads, such as graphics rendering, to one or more GPUs, freeing the general purpose processor for other operations.

While one GPU can execute a large number of computations, two GPUs can possibly do twice the number of computations, and four GPUs can possibly do four times the number of computations. Since a GPU is typically designed to execute operations in parallel, doubling the computational capacity may be simply a matter of treating two GPUs as one resource. To do so, however, the two GPUs may need to have free access to each other's memory. For example, one GPU may produce a computational result that the other GPU uses in subsequent computations. Peer-to-peer communications can enable the GPUs to have potentially unrestricted access to each other's memory spaces and computational resources.

There may be other cases in which PCI endpoint devices may need to share resources. For example, one or more of the PCI endpoints 210, 212, 214, 216 in this example may be network interface cards. In this example, one PCI endpoint may need to share its network connection with another PCI endpoint. As another example, one or more of the PCI endpoints 210, 212, 214, 216 may include a storage interface. In this example, to more efficiently move data, one PCI endpoint may send transactions directly to another PCI endpoint.

In the illustrated example system 200, the two PCI endpoints 210, 212 can use mechanisms provided by the PCI standard for peer-to-peer communications. Specifically, as discussed above, the first switch 208a can route transactions from one PCI endpoint 210 connected to the first switch 208a to another PCI endpoint 212 connected to the same switch 208a. More specifically, first PCI endpoint 210 has an address range, which is typically configured after the system 200 boots and executes hardware configuration. Similarly, the second PCI endpoint 212 also has an address range. Generally, because the two PCI endpoints 210, 212 are attached to the same switch 208a, their address ranges will be non-overlapping. The address ranges may or may not be contiguous. The downstream ports 222 of the switch 208a may further be configured with the address ranges of the PCI endpoint 210, 212 to which the port is attached. Thus, for example, when first PCI endpoint 210 transmits a transaction to the other PCI endpoint 212, the first PCI endpoint 210 can use an address that is within the address range of the second PCI endpoint 212. When the switch 208a receives this transaction, the switch 208a is able to determine that one of its ports (specifically, the downstream port 222 attached to the second PCI endpoint 212) includes the address of the transaction. The switch 208a thus transmits the transaction through that port 222. This example would apply also when the second PCI endpoint 212 is connected to the switch 208a by way of one or more additional switches. In such a case, each intermediate switch would route the transaction in the direction of the second PCI endpoint 212.

When a PCI endpoint needs to execute a peer-to-peer communication with an endpoint that is not within the same hierarchy of switches, the peer-to-peer communication would first go to the root complex 204. Specifically, one PCI endpoint 212, which is connected to the first switch 208a, may need to send a transaction to another PCI endpoint 214, which is connected to the second switch 208b. When the first switch 208a receives such a transaction, the first switch 208a may determine that none of its ports are configured with the address of the transaction. The first switch 208a may thus send the transaction through the upstream port 224a to the root complex 204. At the root complex 204a, the transaction can be routed to the correct downstream port 242c, and from there reach the target PCI endpoint 214.

Though a peer-to-peer communication can thus be accomplished between the first PCI endpoint 210 and the second PCI endpoint 214, having this transaction go by way of the root complex 204 may not be efficient. For example, there may be transaction latency added by having the transaction go all the way up to the root complex 204 and then back down to the target endpoint. As another example, involving the root complex 204 may take the processor(s) 202 away from other operations.

Thus, in various implementations, the example computing system 200 can include a direct link 218 between the first switch 208a and the second switch 208b. That is, a port 220a of the first switch 208a may be physically connected (e.g., using a cable or a trace on a circuit board) to a port 220b of the second switch 208b. These ports 220a, 220b may be referred to hereinafter as "bridging ports," though these ports 220a, 220b are functionally similar to any other downstream port. In some implementations, the switch-to-switch link 218 can be PCI-based interconnect, including the physical and electrical configuration of the link 218, and the protocol used to transfer transaction across the link 218. In some implementations, the switch-to-switch link 218 can be a non-PCI based interconnect that is capable of transferring PCI transactions. For example, the switch-to-switch link 218 can be an Ethernet or Infiniband link, where the Ethernet or Infiniband packets can carry PCI transactions across the link 218.

Generally, a lateral switch-to-switch link 218 is disallowed by the PCI specification for various reasons. For example, the link 218 creates two paths from each endpoint to the root complex. Should a transaction from an endpoint need to go up to the processor(s) 202, there may be ambiguity about which path the transaction should take. As another example, during PCI enumeration, the system 200 may discover each switch 208a, 208b, and PCI endpoint 210, 212, 214, 216, twice: for example, the system 200 may discover the first switch 208a and its associated PCI endpoints 210, 212 by way of the first root complex port 242a, and then a second time by way of the second root complex port 242c and the port 220b that connects the second switch 208b to the first switch 208a. A possible outcome could be that processor(s) 202 see the system 200 as having four switches and eight endpoints.

To enable the switch-to-switch link 218 and avoid incorrectly enumerating the system or creating any kind of ambiguity, the ports 220a, 220b that connect the switches 208a, 208b together may be configured to block, from the point of view of their respective switches 208a, 208b visibility of the other port 220a, 220b. That is, the first bridging port 220a can be configured to block the visibility of the second bridging port 220*b*, such that devices connected to the first switch 208*a* are unaware that the first bridging port 220*a* is connected to another switch. Stated another way, by blocking the visibility of the second bridging port 220*b* from devices connected to the first switch 208*a*, the first bridging port 220*a* appears to be connected to another endpoint, rather than to another switch. The second bridging port 220*b* can be similarly configured, to block visibility of the first bridging port 220*a*, such that devices connected to the second switch 208*b* are not aware that the second bridging port 220*b* is connected to another switch 208*a*.

In some implementations, to block the visibility of one port to devices connected to a switch, the bridging ports 220*a*, 220*b* can be configured as non-transparent bridging (NTB) ports. A non-transparent bridging port is functionally the same as any other port of a switch, except that a non-transparent bridging port is typically configured with a distinct address range. That is, as may be the case in the illustrated example, the bridging port 220*a* of the first switch 208*a* may be configured with an address range that excludes the address ranges of each of the PCI endpoints 210, 212, 214, 216. The bridging port 220*b* of the second switch 208*b* may be configured in the same fashion. Furthermore, a processor on one side of the link 218 does not have the visibility of the complete memory or I/O space on the other side of the link 218. To communicate across the link, each bridge port 220*a*, 220*b* has one (or more) apertures exposed to the system that is local to the bridge port 220*a*, 220*b*. Writes to these apertures can be mirrored to memory on the other side of the link 218. Communications can also occur through the use of doorbell registers that initiate interrupts to the alternate domain, and scratch-pad registers accessible from both sides of the link 218.

Non-transparent bridging is often used in high-availability systems. A high-availability system can include two processor subsystems, where one processor subsystem is "active" while the other processor subsystem is on "standby." The standby processor subsystem may be connected to the computing system through a non-transparent bridging port, and thus be unable to see the rest of the system. The active processor subsystem may be connected to the system through a transparent port, and thus have control over the rest of the system. Should the active processor subsystem become disabled for any reason, its connection to the system can be made non-transparent, thus removing the active processor subsystem from the system. Meanwhile, standby processor subsystem's non-transparent connection can be made transparent, such that the standby processor subsystem can become active and take over the operation of the system where the formerly active processor subsystem left off.

In the example of FIG. 2, non-transparent bridging is being used not to provide high-availability, but rather to enable peer-to-peer communications between PCI endpoints that are in different switch hierarchies. In various implementations, the bridging ports 220*a*, 220*b* can be configured as non-transparent bridging ports when the system 200 boots. For example, an integrated circuit device implemented as a switch may include a hardware configuration that enables non-transparent bridging on any of the device's ports. Configuring the bridging ports 220*a*, 220*b* as non-transparent bridging ports can allow the system 200 to enumerate correctly, in that the enumeration process will see each of the bridging ports 220*a*, 220*b* as independent devices, rather than as a switch link that needs to be followed to discover more devices. The bridging ports 220*a*, 220*b* may further be configured with temporary address ranges, which may assist the system 200 in booting up correctly.

Once the system 200 has booted and is operational, the system 200 can reconfigure the bridging ports 220*a*, 220*b* to enable peer-to-peer communications across the inter-switch link 218. For example, once the system 200 is operational, an operating system may launch and be executed by the processor(s) 202. In this example, the operating system may include a process that analyzes and identifies the address ranges of each of the PCI endpoints 210, 212, 214, 216. The process may then assign, for example, the address ranges of the first pair of PCI endpoints 210, 212 to the bridging port 220*b* of the second switch 208*b*. Similarly, the process may assign the address ranges of the second pair of PCI endpoints 214, 216 to the bridging port 220*a* of the first switch 208*a*. In this example, because all four PCI endpoints 210, 212, 214, 216 are connected to the same root complex 204, the four PCI endpoints 210, 212, 214, 216 would have non-overlapping address ranges.

Thus configured, each of the PCI endpoints 210, 212, 214, 216 can send transactions to another of the PCI endpoints 210, 212, 214, 216 without the transaction needing to go to the root complex. For example, a first PCI endpoint 210 can generate a transaction to a second PCI endpoint 214 using an address that is within the address range of the second PCI endpoint 214. When the first switch 208*a* receives this transaction, the first switch 208*a* can identify the transaction as associated with its bridging port 220*a*. Specifically, the first switch 208*a* can determine that the transaction's address is within the address range configured for the bridging port 220*a*. The first switch 208*a* can then send the transaction using the bridging port 220*a*, over the switch-to-switch link 218, to the second switch 208*b*. When the second switch 208*b* receives the transaction, the second switch 208*b* may store information about the transaction, such as a requester identifier. In various implementations, storing transaction information in this way may be a function associated with non-transparent bridging ports. The second switch 208*b* can further identify the transaction as associated with one of its downstream ports 222. The second switch 208*b* can further transmit the transaction through this downstream port 222 to the second PCI endpoint 214.

In some cases, when the second PCI endpoint 214 receives a transaction, the second PCI endpoint 214 may need to send a response. For example, when the transaction is a read transaction, the second PCI endpoint 214 may need to return the read data. The second PCI endpoint 214 may thus generate a response, and send the response to the second PCI switch 208*b*. When the second PCI switch 208*b* receives the response, the second PCI switch 208*b* can identify the response as associated with its bridging port 220*b*. The second switch 208*b* can make this identification using transaction information stored by at the bridging port 220*b*, such as a requester identifier and/or the address used by the transaction. In some implementations, making this identification is a non-transparent bridging function. The second switch 208*b* may subsequently transmit the response using the bridging port 220*b*. When the first switch 208*a* receives the response, the first switch 208*b* can route the response through the correct port to the recipient PCI endpoint 210.

As illustrated in the above discussion, a transaction originating from the first pair of PCI endpoints 210, 212 and addressed to one of the second pair of PCI endpoints 214, 216, would not be transmitted to or otherwise be seen by the root complex 204. The root complex 204 and associated processor(s) 202 thus need not be involved in the transmission of such a transaction. Additionally, the root complex 204 need not be aware of the configuration of the bridging ports 220a, 220b. A transaction originating with the processor(s) 202 and addressed to, for example, the first PCI endpoint 210 will be directed through the root complex port 242a through which the processor(s) 202 would normally reach this particular PCI endpoint 210. Since the processor(s) 202 are, in most implementations, unaware of the switch-to-switch link 218, and because, in a correctly functioning system, the processor(s) 202 in the preceding example would not send the transaction through any other root complex port, there is little likelihood that a transaction from the processor(s) 202 will ever go across the link 218.

Figure 3:
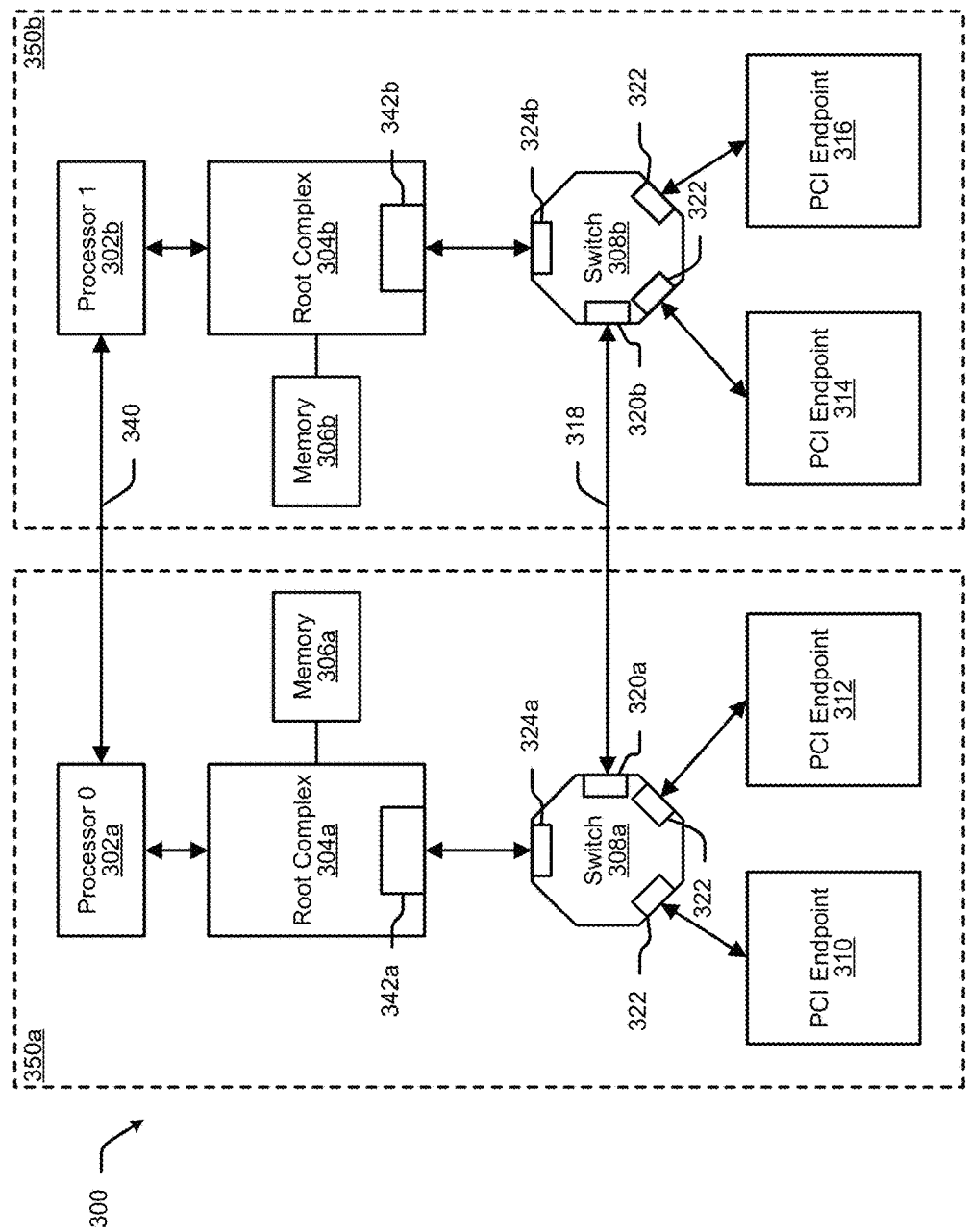
FIG. 3 illustrates another example of a computing system in which peer-to-peer communications between PCI endpoint devices can be enabled.

FIG. 3 illustrates another example of a computing system 300 in which peer-to-peer communications between PCI endpoint devices can be enabled. In this example, the system 300 includes two separate subsystems 350a, 350b. Each subsystem 350a, 350b includes a separate processor 302a, 302b, a separate memory subsystem 306a, 306b, and a separate root complex 304a, 304b. The first subsystem 350a further includes a pair of PCI endpoints 310, 312 connected to the root complex 304a by way of a switch 308a. The second subsystem 350b also includes a pair of PCI endpoints 314, 316, connected to the root complex 304b by way of a different switch 308b.

The processors 302a, 302b may be general purpose computing devices that are generally capable of executing software code. A processor may include multiple processing cores. In some implementations, the root complexes 304a, 304b are integrated into their respective processors 302a, 302b. The root complexes 304a, 304b route transactions between the processors 302a, 302b and any of the endpoints, switches, or bridges, or between the endpoints, switches, and bridges themselves within the same subsystem 350a, 350b. That is, other than as described below with regard to the inter-processor link 340 and the inter-switch link 318, transactions originating within one subsystem (e.g., the first subsystem 350a), stay within the subsystem. The processors 302a, 302b can further move data from their respective memory subsystems 306a, 306b to and from any of the PCI endpoints 310, 312, 314, 316 within the same subsystem. The memory subsystems 306a, 306b provide temporary or long-term storage for data that may be used and operated on by the computing system 300.

As discussed above, each switch 308a, 308b includes downstream ports 322, which are connected, in this example, to the PCI endpoints 310, 312, 314, 316. Each switch 308a, 308b also includes an upstream port 324a, 324b, which in this example are connected to the root complexes 304a, 304b. The PCI endpoints 310, 312, 314, 316 can include GPUs, network interface cards, storage device interfaces, or some other functionality. The PCI endpoints 310, 312, 314, 316 can also be multi-function devices (e.g. a network interface card plus a storage device interface).

Generally, each subsystem 350a, 350b can include a distinct, independent address range. That is, the range of addresses used by the first subsystem 350a can overlap with the range of addresses used by the second subsystem 350b. In various implementations, however, the system 300 can be designed such that the subsystems 350a, 350b do not use overlapping address ranges. In these implementations, overall configuration of the system 300 may be simplified. In various implementations, parts of the range of addresses available within a subsystem 350a, 350b can be allocated to the PCI endpoints. For example, in the first subsystem 350a, some of the available address space can be allocated to the first PCI endpoint 310 and a different, non-overlapping part of the address space can be allocated to the second PCI endpoint 312. Generally, these address assignments occur when the system boots and goes through hardware configuration.

In this example, the computing system 300 can be configured to enable peer-to-peer communications between each of the PCI endpoint 310, 312, 314, 316. As discussed above, the PCI endpoints 310, 312, 314, 316 that are connected to the same switch 308a, 308b can conduct peer-to-peer communications through their respective switches 308a, 308b. For example, a first PCI endpoint 310 can send transactions to a second PCI endpoint 312 connected to the same switch 308a, and the switch 308a will route transaction to the second PCI endpoint 312 without needing to send the transaction to the root complex 304a in the subsystem 350a.

Should, however, one of the PCI endpoints 310 in the first subsystem 350a need to send a transaction to a PCI endpoint 314, 316 that is in the other subsystem 350b the transaction would first have to go to the root complex 304a in the first subsystem 350a. Specifically, the first PCI endpoint 310 can generate a transaction to a PCI endpoint 314 that is in the other subsystem 350b. When the switch 308a to which the first endpoint 310 is connected receives this transaction, the switch 308a can determine that the transaction's address is not associated with any of its ports. The switch 308a may then send the transaction upstream to the root complex 304a.

In various implementations, to transfer transactions between the two subsystems 350a, 350b, the computing system 300 can include an inter-processor communication link 340. The inter-processor link 340 can provide a communication channel between the processors 302a, 302b. In some implementations, the inter-processor link 340 uses a communication protocol that is optimized for making communications between the processors 302a, 302b efficient. As such, the inter-process link 340 may be using a protocol other than PCI, such as for example a protocol that is proprietary to the manufacturer of the processors 302a, 302b. Examples of inter-process communication protocols include QuickPath Interconnect (QPI), front-side bus (FSB), and HyperTransport, among others. In some implementations, such as when the subsystem 350a, 350b are distinctly different systems, the inter-processor link 340 can include any communication link that can be established between the subsystems 350a, 350b. For example, the inter-processor link 340 can be a network link, such as for example an Ethernet, Infiniband, or Remote Direct Memory Access (RDMA) based network link.

While the inter-processor link 340 may provide an efficient communication path between the processors 302a, 302b, the inter-processor link 340 may not be so efficient for peer-to-peer communications between the PCI endpoints 310, 312, 314, 316. For example, for a transaction originating at a first PCI endpoint 310 to go up to the root complex 304a in the same subsystem 350a, across the inter-process ink 340 to the other subsystem 350b, and then from the root complex 304b in the other subsystem 350b to the recipient PCI endpoint 314 may consume considerable amount of time. Additionally, engaging the processors 302a, 302b so that the transaction can be sent across the inter-processor link 340 may take the processors 302a, 302b away from other tasks. Furthermore, when the PCI endpoints 310, 312, 314, 316 engage in many peer-to-peer transactions—which may occur, for example, when the PCI endpoints 310, 312, 314, 316 conduct many parallel computations—the processors 302a, 302b may spend most of their time sending transactions across the inter-processor link 340, rather than conducting other operations.

In various implementations, the computing system 300 is thus provided with a communication link 318 between the switch 308a in the first subsystem 350a and the switch 308b in the second subsystem 350b. The link 318 may include a physical connection (e.g. a cable or a trace on a circuit board) between a port 320a of the first switch 308a and a port 320b of the second switch 308b. These ports 320a, 320b may be referred to hereinafter as "bridging ports." In some implementations, the switch-to-switch link 318 can be PCI-based interconnect, including the physical and electrical configuration of the link 318, and the protocol used to transfer transaction across the link 318. In some implementations, the switch-to-switch link 318 can be a non-PCI based interconnect that is capable of transferring PCI-based transactions. For example, the switch-to-switch link 318 can be an Ethernet or Infiniband link, where the Ethernet or Infiniband packets can carry PCI transactions across the link 318.

In various implementations, the inter-switch link 318, which would normally cause enumeration and configuration problems, is enabled by configuring each of the bridging ports 320a, 320b to block visibility, at their respective switches 308a, 308b, of the other bridging port 320a, 320b. That is, the first bridging port 320a can block visibility of the second bridging port 320b, such that devices connected to the first switch 308a are unaware that the first bridging port 320a is connected to another switch 308b. Similarly, the second bridging port 320b can block visibility of the first bridging port 320a at the second switch 308b.

In various implementations, to enable the bridging ports 320a, 320b to block the visibility of the other bridging port 320a, 320b, the bridging ports 320a, 320b can be configured as non-transparent bridging ports. As discussed above, a non-transparent bridging port can be assigned a distinct address range during boot-up of the system 300. Non-transparent bridging ports also appear as endpoints, and thus during enumeration the system 300 will not cross the link 318 in order to discover the devices on the other side of the link 318.

After the system 300 boots and executes hardware configuration (including device discovery and enumeration) the system 300 can configure the bridging ports 320a, 320b to enable peer-to-peer communications between the PCI endpoints 310, 312, 314, 316. Specifically, the system can configure the bridging port 320a on the first switch 308a to include the address ranges of the two PCI endpoints 314, 316 that are in the other subsystem 350b. In this way, when the PCI endpoints 310, 312 in the first subsystem 350a generate transactions for the PCI endpoints 314, 316 in the other subsystem 350b, the switch 308a will associate the transactions with its bridging port 320a. Specifically, the switch 308a will find that the transaction address is within the address range assigned to the bridging port 320a. The switch 308a will thus transmit the transaction using the bridging port 320a. Once the transaction reaches the other switch 308b, the other switch 308b can route the transaction to the correct recipient PCI endpoint 314, 316. The bridging port 320b of the other switch 308b can also assist in sending a response back to the first subsystem 350a. The bridging port 320b can, for example, store transaction information (e.g., a requester identifier and/or transaction address, or some other information) for the transactions the bridging port 320b receives over the switch-to-switch link 318. When the switch 308b receives a response, the switch 308b can determine that the response should be sent over the bridging port 320b by examining the transaction information.

In various implementations, the bridging port 320b in the second subsystem 350b can also be configured with the address ranges of the PCI endpoints 310, 312 in the first subsystem 350a. In various implementations, the address ranges of the PCI endpoints 310, 312, 314, 316 may be arranged such that the address ranges do not overlap. In these implementations, when, for example, the bridging port 320a in the first subsystem 350a is configured with the address ranges of the PCI endpoints 314, 316 in the second subsystem 350b, no address conflicts result within the switch 308a. In some implementations, the address ranges assigned to the PCI endpoints 310, 312, 314, 316 may be overlapping when the system boots. In these implementations, the system 300 may reassign the address ranges assigned to the PCI endpoints 310, 312, 314, 316 to remove the overlaps. Alternatively, in these implementations, the bridging ports 320a, 320b can be configured to conduct address translations when sending transactions to the opposite switch 308.

In various implementations, the example system 300 illustrated in FIG. 3 can be expanded to include additional PCI endpoints within each subsystem 350a, 350b. In a system with multiple levels of switches, inter-switch communication links can be added at multiple levels. Alternatively or additionally, the system 300 can be expanded by adding additional subsystems. Switches inside each of the additional subsystems can be connected across the subsystems to provide communication links for peer-to-peer communications. In various implementations, the example system 300 can also be combined with the example system 200 of FIG. 2 to provide a system with inter-switch communication links within a subsystem and between subsystems. In any of these various implementations, a switch may have more than one port being used for peer-to-peer communications. Various systems can thus be built where inter-switch communication links can provide peer-to-peer communication channels between PCI endpoints.

Figure 4:
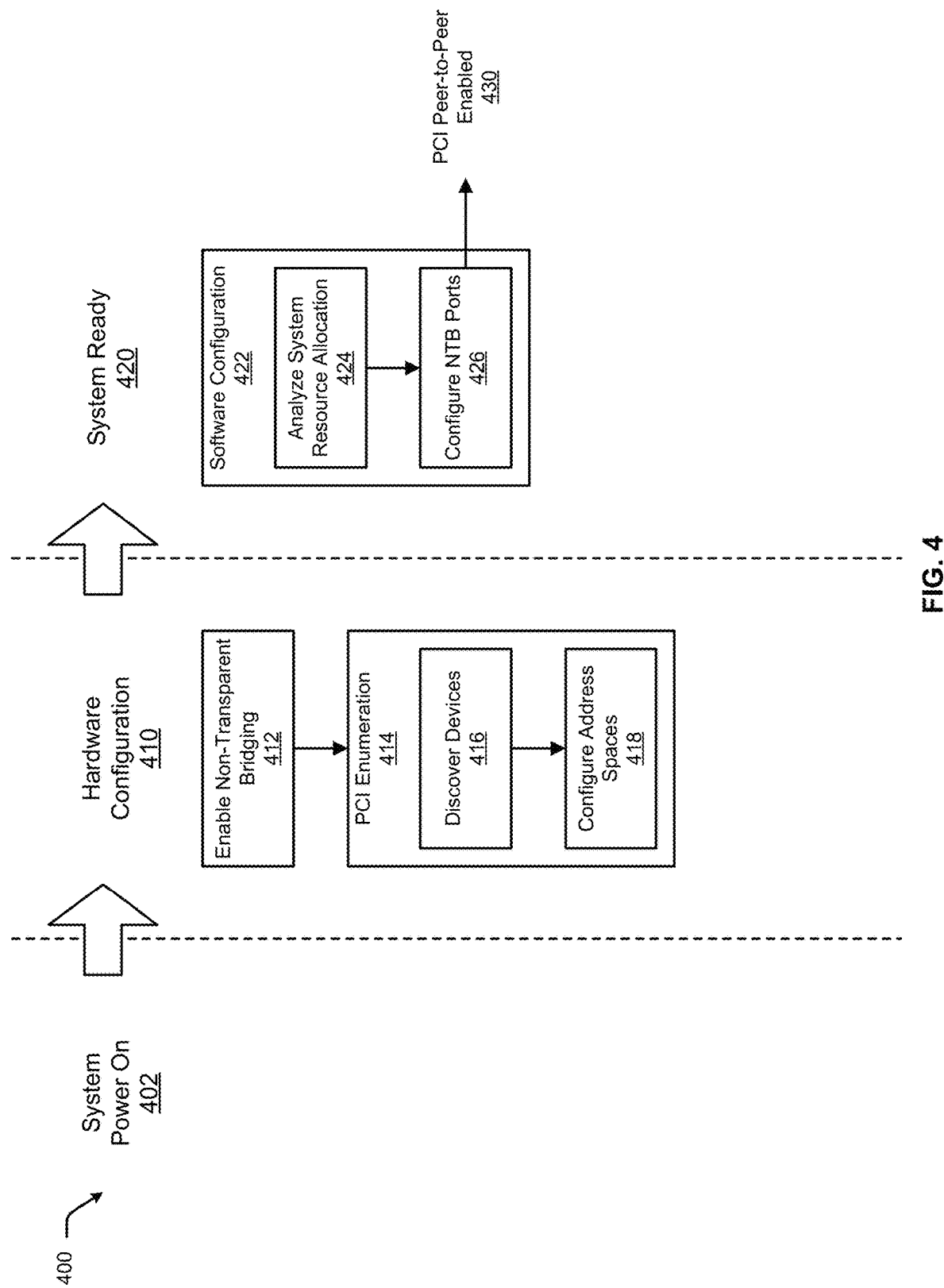
FIG. 4 illustrates an example of a process for configuring a computing system to enable peer-to-peer communications between PCI endpoint devices.

FIG. 4 illustrates an example of a process 400 for configuring a computing system to enable peer-to-peer communications between PCI endpoint devices. In various implementations, the process 400 can be executed by a computing system such as the example computing systems illustrated in FIG. 2 and FIG. 3. In various implementations, the process 400 of FIG. 4 can include boot-up procedures executed by a processor included in the computing system, where the boot-up procedures are provided as instructions stored in non-volatile memory. In various implementations, the process 400 can also include post-boot-up procedures executed by the processor, where the post-boot-up procedures are provided as instructions in either volatile or non-volatile memory.

In various implementations, the process 400 may begin when the computing system experiences a system power on 402. A system power on 402 occurs when power is provided to the computing system. In some implementations, the computing system can also experience a state similar to a system power on 402 after being reset. For example, a "hard reset" can be similar to the computing system having been shut off then powered back on.

In various implementations, after system power on 402, the computing system may execute hardware configuration 410. The hardware configuration 410 phase may include basic configuration necessary to make the computing system operable (e.g., capable of executing software). For example, hardware configuration 410 may include executing a Basic Input/Output System (BIOS) or some similar code. In some cases, a computing system includes a BIOS chip, whose purpose is to execute the BIOS code, though in other cases the BIOS code is executed by a processor. The BIOS code generally locates and tests the hardware components in a computing system to establish the identities, configuration, and/or capabilities of each device. In some implementations, the BIOS code may also include PCI device enumeration procedures. BIOS code is typically stored on an Electrically Erasable Programmable Read-Only Memory (EEPROM).

In various implementations, during hardware configuration 410, the process 400 may include enabling non-transparent bridging 412. Specifically, non-transparent bridging may be enabled for each switch port that is connected to another switch port, where the associated switches are connected (directly or indirectly) to different root complex ports. In some implementations, the enabling non-transparent bridging 412 may be included in the BIOS code. In some implementations, non-transparent bridging may be enabled by configuration code stored in an EEPROM, which may be executed in the course of executing the BIOS code.

In various implementations, after enabling non-transparent bridging at step 412, the process 400 may proceed to a PCI enumeration 414 step. As discussed above, during enumeration, the computing system may, first, discover devices 416 attached to the computing system. Specifically, starting at the root complex, the system can scan available ports and identify endpoints, switches, and/or bridges. When the system locates a switch or bridge, the system can scan the ports of the switch or bridge to identify additional endpoints, switches, or bridges. As noted above, configuring inter-switch ports as non-transparent bridging ports may prevent the system from discovering any devices connected to the non-transparent bridging port. In this way, communication links can be provided between switches that would otherwise cause the system to be enumerated incorrectly.

Once the system has discovered all the devices included in the system, the system may then configure address spaces 418 for each device and port in the system. Configuring the address spaces 418 can include assigning an address range to each endpoint. Configuring the address spaces 418 can further include assigning address ranges to switch ports, where the address ranges assigned to the switch ports indicate the range of address available at the switch port. At this stage, non-transparent bridging ports may be assigned temporary address ranges.

Generally, at the end of the hardware configuration 410 stage, the BIOS code may start a boot loader. The boot loader may load the operating system into memory, and start the operating system. In some cases, the BIOS code may itself load and start the operating system. Once the operating system is running, the system enters a system ready 420 state.

In the system ready 420 state, the system is able to execute normal operating system functions, including executing user applications. In the system ready state 420, the process 400 may include a software configuration 422 step. The software configuration 422 may include analyzing the system resource allocation 424. Analyzing the system resource allocation 424 can include, for example, determining the range of addresses assigned to each PCI endpoint in the system. In some implementations, analyzing the system resource allocation 424 can also include moving some PCI endpoints to different address ranges, either to remove address overlaps or to move the PCI endpoint to more convenient address ranges.

After analyzing the system resources, the process 400 can configure the non-transparent bridging (NTB) ports 426. This step can include assigning address ranges of PCI endpoints to the non-transparent bridging ports, such that the assigned addresses are exposed to endpoints that would otherwise not be able to access these addresses other than through a root complex. Once the non-transparent bridging ports are configured, peer-to-peer communications between PCI endpoints is enabled 430.

In various implementations, the software configuration 422 can occur at any point before peer-to-peer transactions are needed. Generally, however, the software configuration 422 can be executed shortly after the system enters system ready 420 state, so that peer-to-peer communications are available as early as possible.

Figure 5:
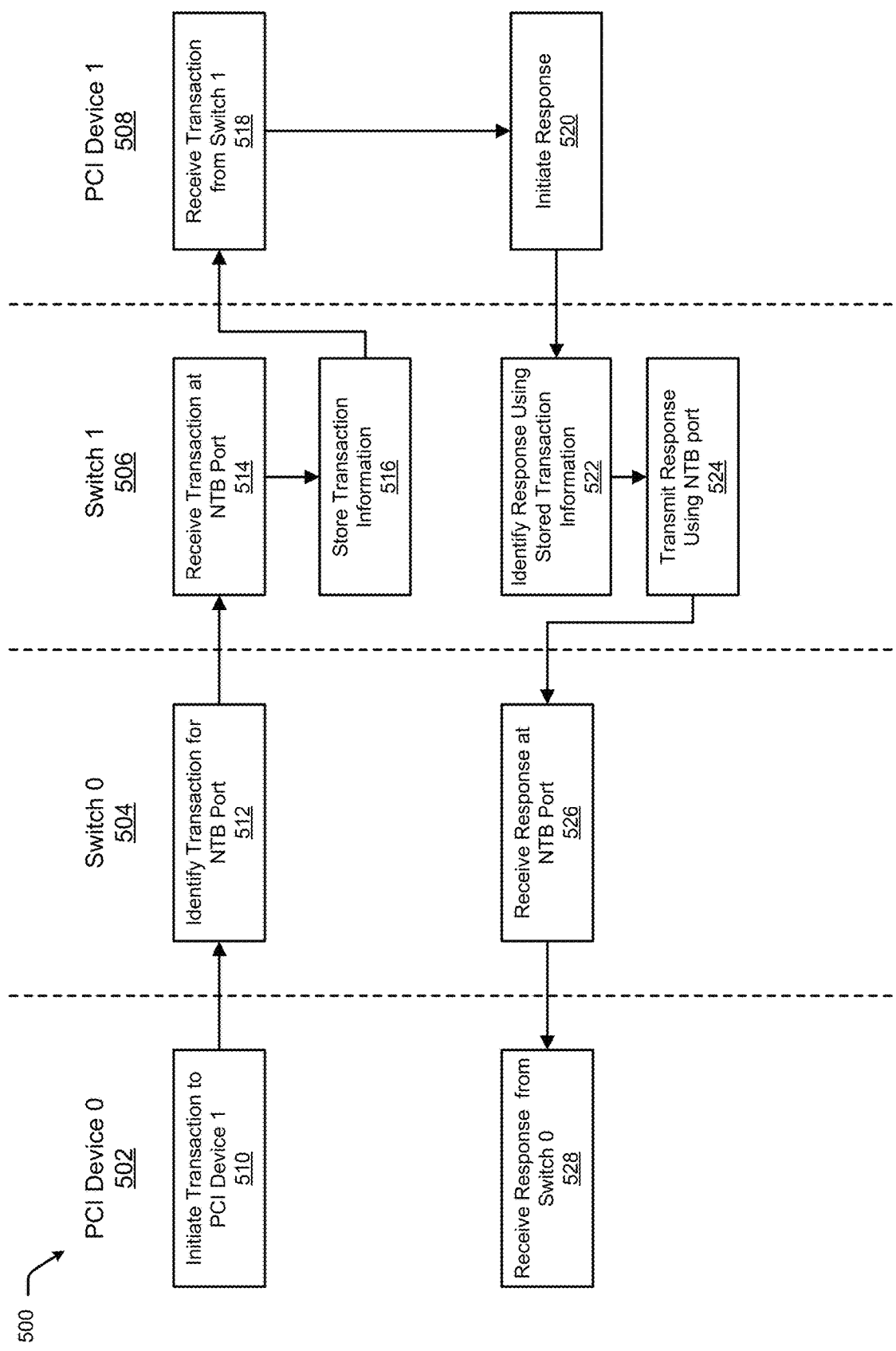
FIG. 5 illustrates an example of a process that can occur during the course of a peer-to-peer transaction between two PCI endpoint devices.

FIG. 5 illustrates an example of a process 500 that can occur during the course of a peer-to-peer transaction between two PCI endpoint devices. In this example process 500, a PCI Device 0 502 sends a transaction to a PCI Device 1 508. In this example, the process 500 includes a Switch 0 504, to which PCI Device 0 502 is (directly or indirectly) connected. The process 500 also includes a Switch 1 506, to which PCI Device 1 508 is (directly or indirectly) connected.

In this example, Switch 0 504 is connected (directly or indirectly) to one root complex port while Switch 1 506 is connected (directly or indirectly) to a different root complex port. The two root complex ports may be on the same root complex or on different root complexes. Due to being connected to different root complex ports, PCI Device 0 502 would have to send transactions to PCI Device 1 508 by way of the root complex(es) unless peer-to-peer communications are enabled through an inter-switch connection. To enable peer-to-peer communications, Switch 0 504 can include one port configured as a non-transparent bridging port. The non-transparent bridging port may be connected to a similarly configured non-transparent bridging port on Switch 1 506. The connection between the non-transparent bridging ports can be used to for peer-to-peer communications between PCI Device 0 502 and PCI Device 1 508.

The example process 500 begins at step 510, where PCI Device 0 502 initiates a transaction to PCI Device 1 510. PCI Device 0 502 can send the transaction to Switch 0 504, which can be responsible for directing the transaction in the correct direction.

At step 512, Switch 0 504 can identify the transaction received from PCI Device 0 502 as associated with Switch 0's 504 non-transparent bridging port. Specifically, Switch 0 504 can determine that the transaction's address is within the address range assigned to the non-transparent bridging port. Having made this determination, Switch 0 504 can transmit the transaction using its non-transparent bridging port, so that the transaction is sent to Switch 1 506.

In some implementations, before transmitted the transaction, Switch 0 504 may modify identification information associated with the transaction. For example, the transaction may include a requester identifier, which identifies the device that requested the transaction. In the example process 500, the requester identifier would identify PCI device 0. In these implementations, Switch 0 504 may change the requester identifier to Switch 0's 504 own requester identifier, or to the requester identifier of the Switch 1 506. In this way, any response to the transaction can be associated with Switch 0 504 (or Switch 1 506) and be properly routed to Switch 0 504.

At step 514, Switch 1 506 can receive the transaction at its own non-transparent bridging port. Switch 1 506 may subsequently, at step 516, store transaction information about the transaction. For example, in some implementations, Switch 1 506 may store a requester identifier and/or a transaction address, or other information about the transaction.

Switch 1 506 may further determine that the transaction is associated with the port to which PCI Device 1 508 is connected. Specifically, Switch 1 506 can determine that the transaction's address is within the address range assigned to the port to witch PCI Device 1 508 is connected. Switch 1 506 can thus transmit the transaction to PCI Device 1 508 using that port.

In some implementations, prior to sending the transaction to PCI Device 1 508, Switch 1 506 may modify identification information associated with the transaction. For example, the transaction may include a requester identifier, which identifies the transaction as having come from PCI device 0 502. In these implementations, Switch 1 506 may change the requester identifier to the requester identifier of Switch 1 506 or to the requester identifier of Switch 0 504. In this way, any response to the transaction can be associated with Switch 1 506 (or Switch 0 504) and be properly routed to Switch 0 504.

At step 518, PCI Device 1 508 can receive the transaction from Switch 1. In some cases, the transaction may require a response from PCI Device 1 508. For example, PCI Device 1 508 may indicate to PCI Device 0 502 that the transaction completed successfully or that the transaction suffered an error. At step 520, PCI Device 1 may initiate a response, and send the response to Switch 1 506.

At step 522, Switch 1 506 can identify the response using the stored transaction information. For example, the response may include a requester identifier, where the requester identifier identifies the device that requested the transaction. Identifying the response may further include determining that the requester is on the other side of the non-transparent bridging port. Thus, at step 524, Switch 1 506 transmits the response using the non-transparent bridging port.

In some implementations, prior to transmitting the response to Switch 0 504, Switch 1 506 may modify identification information associated with the response. For example, the response may have a requester identifier, which was taken from the transaction to which the response is responding. In this example, the requester identifier may be an identifier associated with Switch 1 506 or Switch 0 504, so that the response can be directed over the switch-to-switch link to Switch 0 504. In this example, Switch 1 506 may change a requester identifier associated with the response to the requester identifier of the device that originated the transaction (PCI Device 0 502, in this example). By modifying the requester identifier, the response can be automatically routed to PCI Device 0 502.

At step 526, Switch 0 504 receives the response at its own non-transparent bridging port. Switch 0 504 can process the response as any other response, and determine that the response should be transmitted using the port to which PCI Device 0 502 is connected.

In some implementations, prior to sending the response to PCI Device 0 502, Switch 0 504 may modify identification information associated with the transaction. For example, Switch 0 504 may modify a requester identifier, which identifies the transaction as having come from Switch 0 504 or Switch 1 506. In this example, Switch 0 504 can change the requester identifier to the identifier associated with PCI Device 0 502, so that the response can be automatically routed to PCI Device 0 502.

At step 528, PCI Device 0 502 receives the response, which completes the transaction that PCI device 0 502 initiated at step 510.

Figure 6:
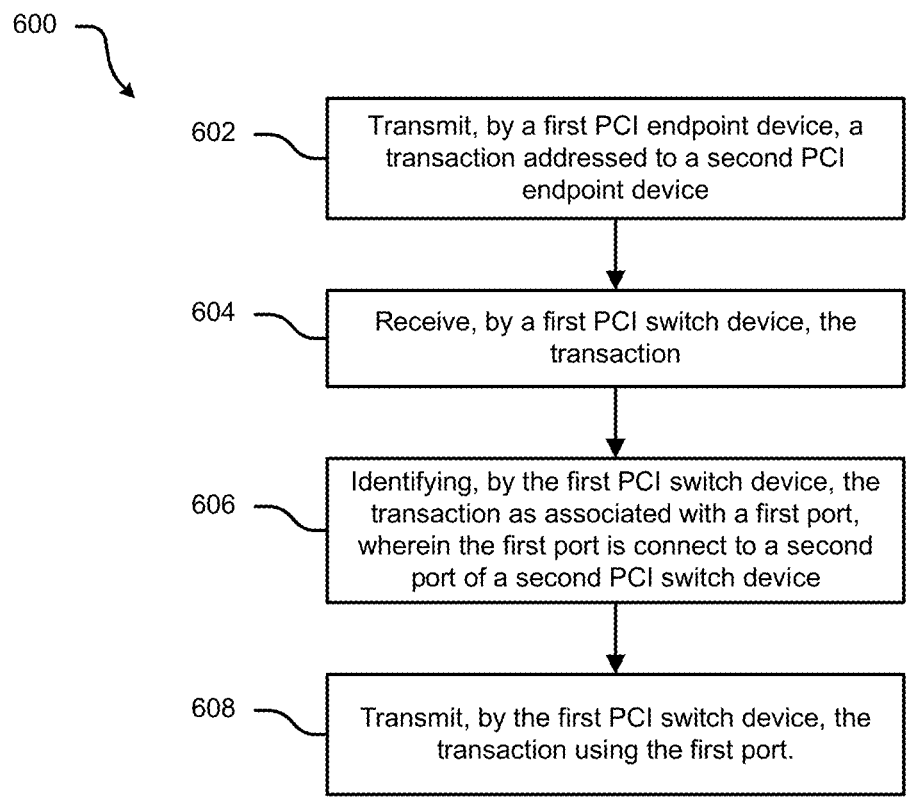
FIG. 6 illustrates an example of a method for transmitting a peer-to-peer communication between two switch devices.

FIG. 6 illustrates an example of a method 600 for transmitting a peer-to-peer communication between two switch devices. These methods may be implemented by the systems described above, such as for example the systems illustrated in FIG. 2 and FIG. 3.

At step 602 of FIG. 6, the system may transmit, by a first PCI endpoint device, a transaction addressed to a second PCI endpoint device. Both the first PCI endpoint device and the second PCI endpoint device can be included in the same computing system. The transaction can be a read transaction or a write transaction, for example to a memory of the second PCI endpoint device.

At step 604, the system may receive, at a first PCI switch device, the transaction. The first PCI switch device can include a first port. In various implementations, the first port can be configured to block visibility, at the first PCI switch device, of the first port's connection to another device. In various implementations, the first port can be configured, at boot time, with a temporary address range. In various implementations, the first port can be associated with an address range of the second PCI endpoint device during configuration of the system.

In various implementations, the first PCI switch device can also be communicatively coupled to a first root complex port. "Communicatively coupled" in this context means that the first PCI switch device is either directly connected to the first root complex port (e.g. using a single interconnect) or that the first PCI switch device is indirectly connected to the first root complex port (e.g., through one or more intermediate switch devices).

At step 606, the system may identify, using the first PCI switch device, the transaction as associated with the first port. For example, the first PCI switch device may determine that an address of the transaction falls within an address range that is associated with the first port. The first port may be connected to a second port of a second PCI switch device. In this context, "connected" means that the first port is physical and directly connected to the second port.

The second PCI switch device can be communicatively coupled to a second root complex port. The first root complex port can be different from the second root complex port, such that the first PCI switch device and the second PCI switch device are in different address domains. In some implementations, the first root complex port is associated with a first processor and the second root complex port is associated with a second, different processor.

At step 608, the system may transmit, using the first PCI switch device, the transaction using the first port. The transaction may subsequently arrive at the second PCI switch device, which can route the transaction to the second PCI endpoint device. In various implementations, the second PCI switch device may store information for the transaction, such as for example information that identifies the transaction (e.g. a requester identifier, an address, a bus number, etc.).

In various implementations, upon receiving the transaction, the second PCI endpoint device may generate a response to the transaction. The second PCI endpoint device may transmit the response, which is then received by the second PCI switch device. The second PCI switch device may identify the response as associated with the transaction. For example, the second PCI switch device may use information stored for the transaction to associate the response with the transaction. The second PCI switch device may then transmit the response using the second port. The first PCI switch device will subsequently receive the response, and route the response to the first PCI endpoint device.

In various implementations, the second PCI switch device has access to a PCI address range, such as for example the address range of the second PCI endpoint device. In these implementations, when the first PCI switch device receives a transaction addressed to PCI address range, the first PCI switch can be configured to identify the transaction as associated with the first port, and to transmit the transaction using the first port.

Figure 7:
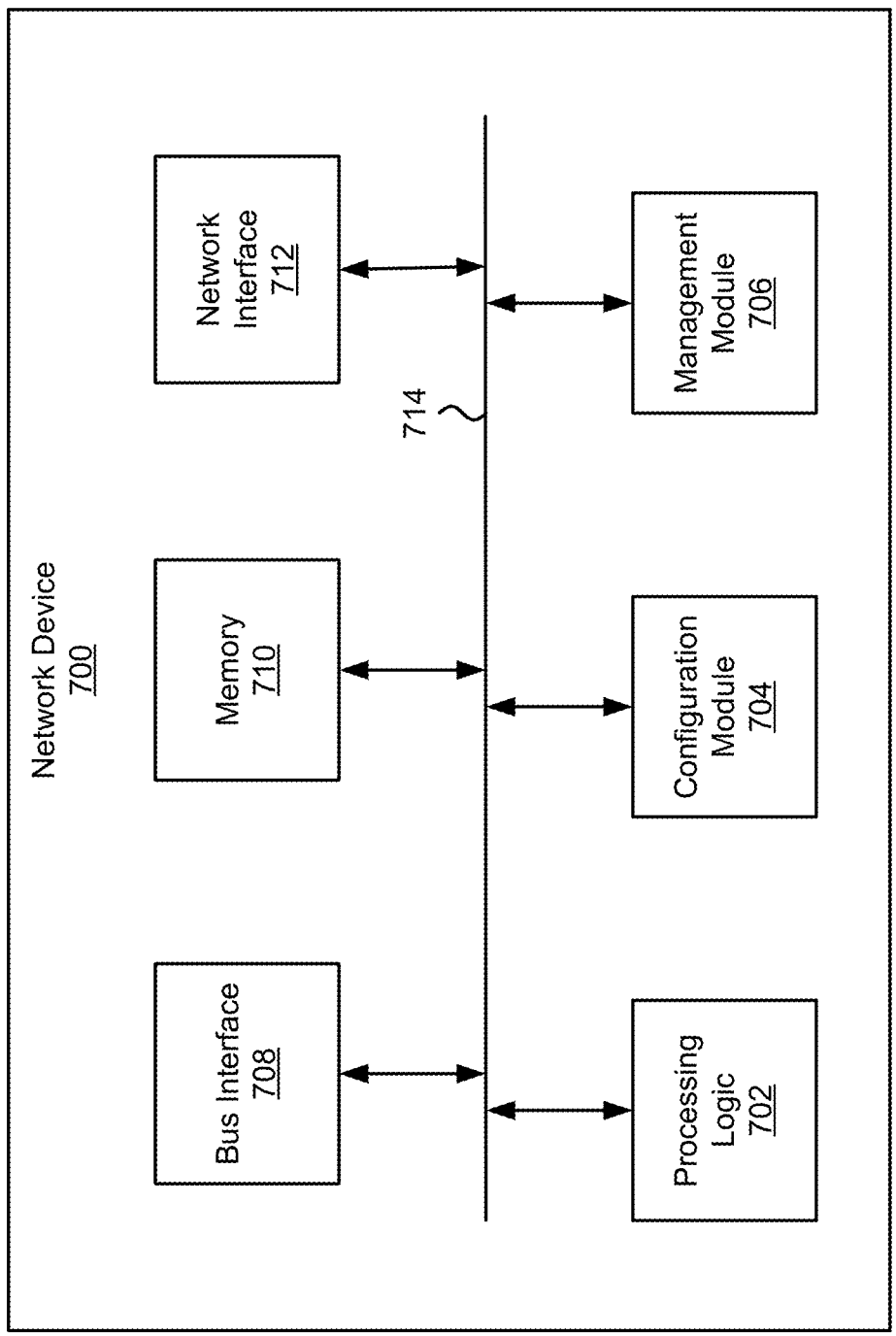
FIG. 7 illustrates an example of a network device, according to certain aspects of the disclosure.

FIG. 7 illustrates an example of a network device 700. Functionality and/or several components of the network device 700 may be used without limitation with other embodiments disclosed elsewhere in this disclosure, without limitations. A network device 700 may facilitate processing of packets and/or forwarding of packets from the network device 700 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 700 may be the recipient and/or generator of packets. In some implementations, the network device 700 may modify the contents of the packet before forwarding the packet to another device. The network device 700 may be a peripheral device coupled to another computer device, a switch, a router or any other suitable device enabled for receiving and forwarding packets.

In one example, the network device 700 may include processing logic 702, a configuration module 704, a management module 706, a bus interface module 708, memory 710, and a network interface module 712. These modules may be hardware modules, software modules, or a combination of hardware and software. In certain instances, modules may be interchangeably used with components or engines, without deviating from the scope of the disclosure. The network device 700 may include additional modules, not illustrated here, such as components discussed with respect to the nodes disclosed in FIG. 8. In some implementations, the network device 700 may include fewer modules. In some implementations, one or more of the modules may be combined into one module. One or more of the modules may be in communication with each other over a communication channel 714. The communication channel 714 may include one or more busses, meshes, matrices, fabrics, a combination of these communication channels, or some other suitable communication channel.

The processing logic 702 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 702 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 702 may be stored on a computer-readable storage medium, for example, in the form of a computer program. The computer-readable storage medium may be non-transitory. In some cases, the computer-readable medium may be part of the memory 710.

The memory 710 may include either volatile or non-volatile, or both volatile and non-volatile types of memory. The memory 710 may, for example, include random access memory (RAM), read only memory (ROM), Electrically Erasable Programmable Read-Only Memory (EEPROM), flash memory, and/or some other suitable storage media. In some cases, some or all of the memory 710 may be internal to the network device 700, while in other cases some or all of the memory may be external to the network device 700. The memory 710 may store an operating system comprising executable instructions that, when executed by the processing logic 702, provides the execution environment for executing instructions providing networking functionality for the network device 700. The memory may also store and maintain several data structures and routing tables for facilitating the functionality of the network device 700.

In some implementations, the configuration module 704 may include one or more configuration registers. Configuration registers may control the operations of the network device 700. In some implementations, one or more bits in the configuration register can represent certain capabilities of the network device 700. Configuration registers may be programmed by instructions executing in the processing logic 702, and/or by an external entity, such as a host device, an operating system executing on a host device, and/or a remote device. The configuration module 704 may further include hardware and/or software that control the operations of the network device 700.

In some implementations, the management module 706 may be configured to manage different components of the network device 700. In some cases, the management module 706 may configure one or more bits in one or more configuration registers at power up, to enable or disable certain capabilities of the network device 700. In certain implementations, the management module 706 may use processing resources from the processing logic 702. In other implementations, the management module 706 may have processing logic similar to the processing logic 702, but segmented away or implemented on a different power plane than the processing logic 702.

The bus interface module 708 may enable communication with external entities, such as a host device and/or other components in a computing system, over an external communication medium. The bus interface module 708 may include a physical interface for connecting to a cable, socket, port, or other connection to the external communication medium. The bus interface module 708 may further include hardware and/or software to manage incoming and outgoing transactions. The bus interface module 708 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 708 may include the physical layer for any of these bus protocols, including a connector, power management, and error handling, among other things. In some implementations, the network device 700 may include multiple bus interface modules for communicating with multiple external entities. These multiple bus interface modules may implement the same local bus protocol, different local bus protocols, or a combination of the same and different bus protocols.

The network interface module 712 may include hardware and/or software for communicating with a network. This network interface module 712 may, for example, include physical connectors or physical ports for wired connection to a network, and/or antennas for wireless communication to a network. The network interface module 712 may further include hardware and/or software configured to implement a network protocol stack. The network interface module 712 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 700 may include multiple network interface modules, each configured to communicate with a different network. For example, in these implementations, the network device 700 may include a network interface module for communicating with a wired Ethernet network, a wireless 802.11 network, a cellular network, an Infiniband network, etc.

The various components and modules of the network device 700, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 8.

Figure 8:
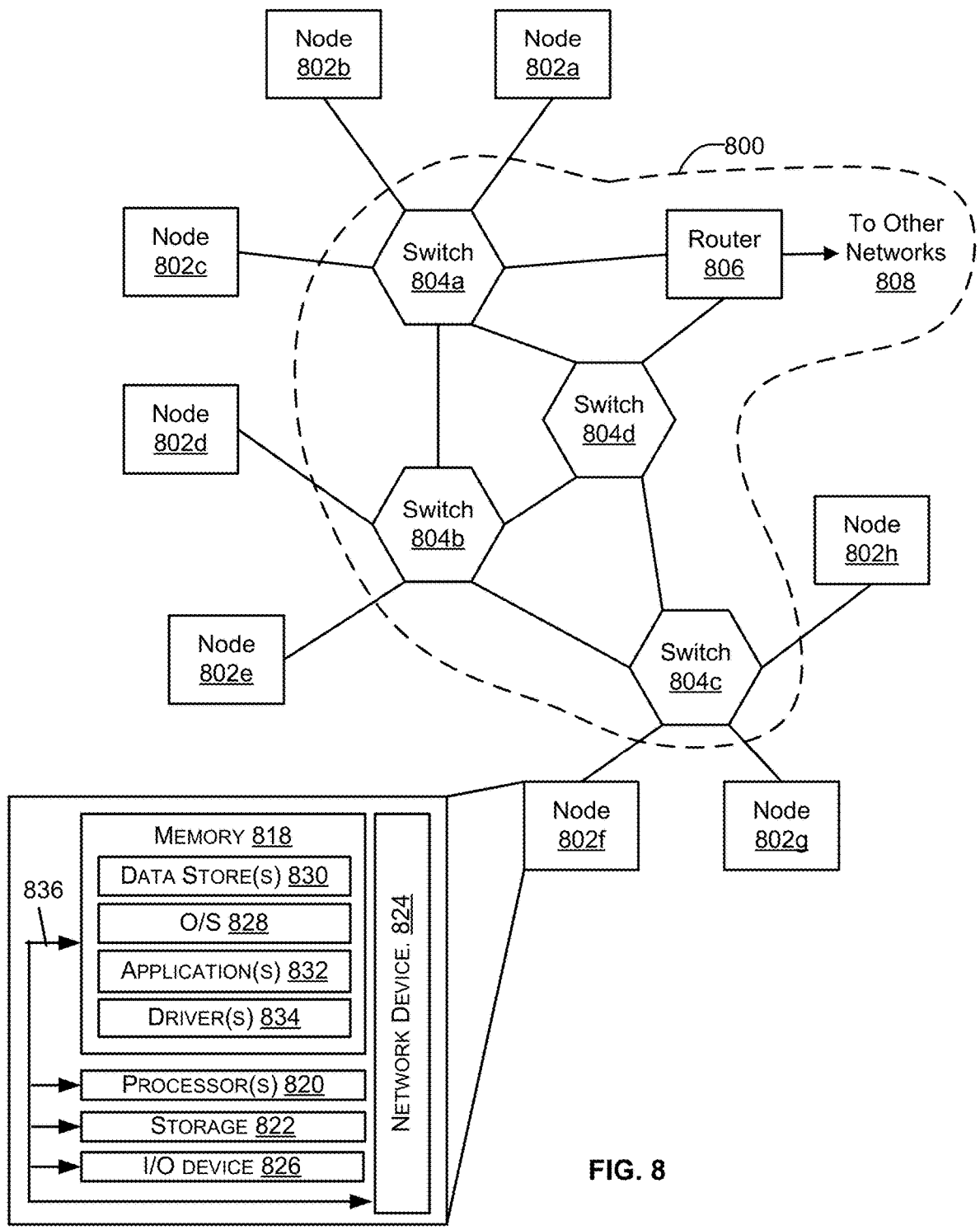
FIG. 8 illustrates an example architecture for features and systems described herein that includes one or more service provider computers and/or a user device connected via one or more networks, according to certain aspects of the disclosure.

FIG. 8 illustrates a network 800, illustrating various different types of network devices 700 of FIG. 7, such as nodes comprising the network device, switches and routers. In certain embodiments, the network 800 may be based on a switched architecture with point-to-point links. As illustrated in FIG. 8, the network 800 includes a plurality of switches 804a-804d, which may be arranged in a network. In some cases, the switches are arranged in a multi-layered network, such as a Clos network. A network device 700 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 804a-804d may be connected to a plurality of nodes 802a-802h and provide multiple paths between any two nodes.

The network 800 may also include one or more network devices 700 for connection with other networks 808, such as other subnets, LANs, wide area networks (WANs), or the Internet, and may be referred to as routers 806. Routers use headers and forwarding tables to determine the best path for forwarding the packets and use protocols such as internet control message protocol (ICMP) to communicate with each other and configure the best route between any two devices.

In some examples, network(s) 800 may include any one or a combination of many different types of networks, such as cable networks, the Internet, wireless networks, cellular networks and other private and/or public networks. Interconnected switches 804a-804d and router 806, if present, may be referred to as a switch fabric, a fabric, a network fabric, or simply a network. In the context of a computer network, terms "fabric" and "network" may be used interchangeably herein.

Nodes 802a-802h may be any combination of host systems, processor nodes, storage subsystems, and I/O chassis that represent user devices, service provider computers or third party computers.

User devices may include computing devices to access an application 832 (e.g., a web browser or mobile device application). In some aspects, the application 832 may be hosted, managed, and/or provided by a computing resources service or service provider. The application 832 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 808. Additionally, the user device(s) may be part of the distributed system managed by, controlled by, or otherwise part of the service provider computer(s) (e.g., a console device integrated with the service provider computers).

The node(s) of FIG. 8 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking, and/or storage devices. A hosted computing environment may also be referred to as a cloud computing environment. The service provider computer(s) may include one or more servers, perhaps arranged in a cluster, as a server farm, or as individual servers not associated with one another and may host the application 832 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 802a-802h may include at least one memory 818 and one or more processing units (or processor(s)) 820. The processor(s) 820 may be implemented in hardware, computer-executable instructions, firmware, or combinations thereof.

Computer-executable instruction or firmware implementations of the processor(s) 820 may include computer-executable or machine-executable instructions written in any suitable programming language to perform the various functions described.

In some instances, the hardware processor(s) 820 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 818 may store program instructions that are loadable and executable on the processor(s) 820, as well as data generated during the execution of these programs. Depending on the configuration and type of the node(s) 802a-802h, the memory 818 may be volatile (such as RAM) and/or non-volatile (such as ROM, flash memory, etc.). The memory 818 may include an operating system 828, one or more data stores 830, one or more application programs 832, one or more drivers 834, and/or services for implementing the features disclosed herein.

The operating system 828 may support nodes 802a-802h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 828 may also be a proprietary operating system.

The data stores 830 may include permanent or transitory data used and/or operated on by the operating system 828, application programs 832, or drivers 834. Examples of such data include web pages, video data, audio data, images, user data, and so on. The information in the data stores 830 may, in some implementations, be provided over the network(s) 808 to user devices 804. In some cases, the data stores 830 may additionally or alternatively include stored application programs and/or drivers. Alternatively or additionally, the data stores 830 may store standard and/or proprietary software libraries, and/or standard and/or proprietary application user interface (API) libraries. Information stored in the data stores 830 may be machine-readable object code, source code, interpreted code, or intermediate code.

The drivers 834 include programs that may provide communication between components in a node. For example, some drivers 834 may provide communication between the operating system 828 and additional storage 822, network device 824, and/or I/O device 826. Alternatively or additionally, some drivers 834 may provide communication between application programs 832 and the operating system 828, and/or application programs 832 and peripheral devices accessible to the service provider computer. In many cases, the drivers 834 may include drivers that provide well-understood functionality (e.g., printer drivers, display drivers, hard disk drivers, Solid State Device drivers). In other cases, the drivers 834 may provide proprietary or specialized functionality.

The service provider computer(s) or servers may also include additional storage 822, which may include removable storage and/or non-removable storage. The additional storage 822 may include magnetic storage, optical disks, solid state disks, flash memory, and/or tape storage. The additional storage 822 may be housed in the same chassis as the node(s) 802a-802h or may be in an external enclosure. The memory 818 and/or additional storage 822 and their associated computer-readable media may provide non-volatile storage of computer-readable instructions, data structures, program modules, and other data for the computing devices. In some implementations, the memory 818 may include multiple different types of memory, such as SRAM, DRAM, or ROM.

The memory 818 and the additional storage 822, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 818 and the additional storage 822 are examples of computer storage media. Additional types of computer storage media that may be present in the node(s) 802a-802h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 802a-802h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 802a-802h may also include I/O device(s) 826, such as a keyboard, a mouse, a pen, a voice input device, a touch input device, a display, speakers, a printer, and the like. The node(s) 802a-802h may also include one or more communication channels 836. A communication channel 836 may provide a medium over which the various components of the node(s) 802a-802h can communicate. The communication channel or channels 836 may take the form of a bus, a ring, a switching fabric, or a network.

The node(s) 802a-802h may also contain network device(s) 824 that allow the node(s) 802a-802h to communicate with a stored database, another computing device or server, user terminals and/or other devices on the network(s) 800. The network device(s) 824 of FIG. 8 may include similar components discussed with reference to the network device 700 of FIG. 7.

In some implementations, the network device 824 is a peripheral device, such as a PCI-based device. In these implementations, the network device 824 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 708 may implement NVMe, and the network device 824 may be connected to a computing system using a PCIe interface.

A PCI-based device may include one or more functions. A "function" describes operations that may be provided by the network device 824. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 824 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules, or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 7, FIG. 8, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computing system, comprising:
a first Peripheral Component Interconnect (PCI) switch device, wherein the first PCI switch device includes a first port, wherein the first PCI switch device includes a first upstream port that is communicatively coupled to a first root complex port of a root complex;
a second PCI switch device, wherein the second PCI switch device includes a second port, wherein the second port is connected to the first port, wherein the second port is configured to block, from the second PCI switch device, visibility of the first port, wherein the first port is configured to block, from the first PCI switch device, visibility of the second port, wherein the second PCI switch device includes a second upstream port that is communicatively coupled to a second root complex port of the root complex, wherein the first root complex port is different from the second root complex port;
a first PCI endpoint device communicatively coupled to the first PCI switch device, wherein the first PCI endpoint device includes a PCI address range; and
a second PCI endpoint device communicatively coupled to the second PCI switch device;
wherein the computing system is configured to, subsequent to booting, execute a configuration procedure, wherein the configuration procedure includes configuring the second PCI switch device to associate the second port with the PCI address range;
wherein the second PCI endpoint device is configured to, subsequent to the configuration procedure, transmit a transaction using a PCI address from the PCI address range;
wherein, when the second PCI switch device receives the transaction, the second PCI switch device is configured to:
identify the transaction as associated with the second port; and
transmit the transaction to the first PCI switch device using the second port without transmitting the transaction to the root complex using the second upstream port.

2. The computing system of claim 1, wherein the first PCI endpoint device is configured to transmit a response to the transaction, and wherein, when the first PCI switch device receives the response, the first PC switch device is configured to identify the response as associated with the transaction and to transmit the response using the first port.

3. The computing system of claim 1, wherein the first PCI endpoint device includes a Graphics Processing Unit (GPU) and memory.

4. The computing system of claim 1, wherein the first PCI endpoint device includes a network adapter or a storage interface adapter.

5. The computing system of claim 1, wherein the transaction is a memory transaction.

6. A computing system, comprising:
a first Peripheral Component Interconnect (PCI) switch device configured to process PCI-based transactions, wherein the first PCI switch device includes a first port, wherein the first PCI switch device includes a first upstream port that is communicatively coupled to a first root complex port of a root complex, and wherein the first PCI switch device has access to a first PCI address range; and
a second PCI switch device configured to process PCI-based transactions, wherein the second PCI switch device includes a second port, wherein the second port is connected to the first port, wherein the second PCI switch device includes a second upstream port that is communicatively coupled to a second root complex port of the root complex, wherein the first root complex port is different from the second root complex port, and wherein, when the second PCI switch device receives a transaction addressed to the first PCI address range, the second PCI switch device is configured to identify the transaction as associated with the second port and to transmit the transaction using the second port without transmitting the transaction to the root complex using the second upstream port.

7. The computing system of claim 6, wherein the first PCI address range is associated with a downstream port of the first PCI switch device.

8. The computing system of claim 6, wherein the transaction addressed to the first PCI address range is received at a downstream port of the second PCI switch device.

9. The computing system of claim 6, wherein, when the first PCI switch device receives the transaction, the first PCI switch device is configured to modify identification information associated with the transaction, wherein the identification information identifies an originator of the transaction.

10. The computing system of claim 6, wherein, when the second PCI switch device receives the transaction, the second PCI switch device is configured to modify identification information associated with the transaction, wherein the identification information identifies an originator of the transaction.

11. The computing system of claim 6, wherein, when the first PCI switch device receives the transaction at the first port, the first PCI switch device is configured to:
store transaction information for the transaction; and
transmit the transaction using another port.

12. The computing system of claim 6, wherein, when the first PCI switch device receives a response, the first PCI switch device is configured to:
identify the response as associated with the transaction; and
transmit the response using the first port.

13. The computing system of claim 6, wherein the first port and the second port are configured as non-transparent bridging ports.

14. The computing system of claim 6, wherein the second port is connected to the first port using a communication link that is capable of transferring PCI-based transactions.

15. The computing system of claim 6, wherein the computing system is configured to, upon booting:
configure the second port to block visibility, from the second PCI switch device, of the first port.

16. The computing system of claim 6, wherein the computing system is configured to, upon booting:
configure the second port with a second temporary address range.

17. The computing system of claim 6, wherein the computing system is configured to:
associate the second port with the first PCI address range.

18. The computing system of claim 6, wherein the second PCI switch device has access to a second PCI address range, and wherein, when the first PCI switch device receives a transaction addressed to the second PCI address range, the first PCI switch device is configured to identify the transaction as associated with the first port and to transmit the transaction using the first port.

19. The computing system of claim 6, wherein the first root complex port is associated with a first processor and wherein the second root complex port is associated with a second processor.

20. A method, comprising:
transmitting, by a first Peripheral Component Interconnect (PCI) endpoint device in a computing system, a transaction addressed to a second PCI endpoint device in the computing system;
receiving, by a first PCI switch device in the computing system, the transaction, wherein the first PCI switch device is configured to process PCI-based transactions, wherein the first PCI switch device includes a first port, and wherein the first PCI switch device includes a first upstream port that is communicatively coupled to a first root complex port of a root complex;
identifying, by the first PCI switch device, the transaction as associated with the first port, wherein the first port is connected to a second port of a second PCI switch device in the computing system, wherein the second PCI switch device is configured to process PCI-based transactions, wherein the second PCI switch device includes a second upstream port that is communicatively coupled to a second root complex port of the root complex, wherein the first root complex port is different from the second root complex port; and
transmitting, by the first PCI switch device, the transaction using the first port without transmitting the transaction to the root complex using the second upstream port.

21. The method of claim 20, further comprising:
transmitting, by the second PCI endpoint device, a response to the transaction;
receiving, by the second PCI switch device, the response;
identifying, by the second PCI switch device, the response as associated with the transaction, wherein the identifying includes using stored transaction information; and
transmitting, by the second PCI switch device, the response using the second port.

22. The method of claim 20, further comprising:
configuring, at boot time, the first port to block visibility, at the first PCI switch device, of the second port.

23. The method of claim 20, further comprising:
configuring, at boot time, the first port with a first temporary address range.

24. The method of claim 20, further comprising:
associating the first port with PCI address range of the second PCI endpoint device.

* * * * *